(12) United States Patent
Antonsson et al.

(10) Patent No.: US 10,977,879 B2
(45) Date of Patent: Apr. 13, 2021

(54) METHOD AND SYSTEM FOR VEHICLE PLATFORM VALIDATION

(71) Applicant: Volvo Car Corporation, Gothenburg (SE)

(72) Inventors: Anders Antonsson, Västra Frölunda (SE); Ola Reiner, Västra Frölunda (SE)

(73) Assignee: Volvo Car Corporation, Göteborg (SE)

( * ) Notice: Subject to any disclaimer, the term of this patent is extended or adjusted under 35 U.S.C. 154(b) by 279 days.

(21) Appl. No.: 16/022,971

(22) Filed: Jun. 29, 2018

(65) Prior Publication Data

US 2019/0139332 A1 May 9, 2019

(30) Foreign Application Priority Data

Jun. 29, 2017 (EP) ..................................... 17178604

(51) Int. Cl.
| | | |
|---|---|---|
| *G07C 5/08* | (2006.01) | |
| *G06F 8/35* | (2018.01) | |
| *G06F 8/71* | (2018.01) | |
| *G06F 11/07* | (2006.01) | |
| *G06F 8/77* | (2018.01) | |

(Continued)

(52) U.S. Cl.
CPC .............. *G07C 5/08* (2013.01); *G06F 8/355* (2013.01); *G06F 8/36* (2013.01); *G06F 8/71* (2013.01); *G06F 8/77* (2013.01); *G06F 11/0739* (2013.01); *G06F 16/252* (2019.01); *G07C 5/02* (2013.01); *G06F 9/44505* (2013.01); *G06F 9/44536* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,397,019 | B2 * | 8/2019 | Hartung | ............... G05D 1/0077 |
| 2020/0151611 | A1 * | 5/2020 | McGavran | ............. G06N 20/00 |
| 2020/0272455 | A1 * | 8/2020 | Mezaael | ................. H04W 4/40 |

OTHER PUBLICATIONS

Salikiryaki, Aleksandra, and Iliana Petrova. "Graphical approach for variability management in safety-critical product lines." (Jul. 2015). Malardealen University Department of Innovation, Design and Engineering. pp. 1-133. (Year: 2015).*

(Continued)

*Primary Examiner* — Thomas G Black
*Assistant Examiner* — Ana D Thomas
(74) *Attorney, Agent, or Firm* — Clements Bernard Walker; Christopher L. Bernard

(57) ABSTRACT

A method of evaluating compatibility of a first system component of a vehicle, the method including providing a database including vehicle platform configuration information including configuration information about two or more vehicle models, wherein each vehicle model includes one or more aspect domains and each aspect domain includes one or more system components. Each system component includes configuration information. At least two system components of two different vehicle models belong to the same aspect domain. The method also includes determining a compatibility result between said first system component and at least one other system component in said vehicle platform by comparing the configuration information of said first system component to the configuration information of said at least one other system component.

16 Claims, 26 Drawing Sheets

(51) Int. Cl.
　　　*G06F 8/36*　　(2018.01)
　　　*G06F 16/25*　(2019.01)
　　　*G07C 5/02*　　(2006.01)
　　　*G06F 9/445*　(2018.01)

(56) References Cited

OTHER PUBLICATIONS

Durisic Darko et al.: "Addressing the need for strict meta-modeling in practice—a case study of AUTOSAR" 2016 4th International Conference on Model-Driven Engineering and Software Development (MODELSWARD),Scitepress, Feb. 19, 2016 (Feb. 19, 2016), pp. 317-322, XP033106925.

Kuo-Cheng Tai et al: "A test generation strategy for pairwise testing", IEEE Transactions on Software Engineering,IEE Service Center, Los Alamitos, CA, US, vol. 28, No. 1, Jan. 2002 (Jan. 1, 2002), pp. 109-111. XP011094033.

Durisic Darko et al. "ARCA—Automated Analysis of AUTOSAR Meta-model Changes", 2015 IEEE/ACM 7th International Workshop on Modeling in Software Engineering, EEE, May 16, 2015 (May 16, 2015), pp. 30-35, XP033182139.

Maxime Jimenez et al: "Measuring the Evolution of Metamodels—A Case Study of Modelica and UML Meta-models", Proceeding of the 5th International Conference on Model-Driven Engineering and Software Development, MODELSWARD 2017, Porto, Portugal, Feb. 19-21, 2017, Feb. 1, 2017 (Feb. 1, 2017), pp. 496-502, XP055420623.

Nov. 3, 2017 European Search Report issue on International Application No. EP17178604.9.

Oct. 12, 2018 European Search Report issue on International Application No. EP18180737.

Aleksandra Salikiryaki et al.,Graphical Approach for Variability Management in Safety-Critical Product Lines, Jul. 15, 2015, pp. 6-119.

Durisic Darko et al., Addressing the need for strict meta-modeling in practice—a case study of AUTOSAR, Feb. 19, 2016, pp. 317-322.

Kuo-Chung Tai et al., A test generation strategy for pairwise testing vol. 28 No. 1, Jan. 1, 2002, figures 1-2 paragraphs 0001-0004.

Maenad, East—ADL Introduction,Presentations of MAENAD EU FP1 Project, Jan. 1, 2012, pp. 1-32.

Maenad,East—ADL Introduction,Presentations of MAENAD EU FP1 Project, Jan. 1, 2013, pp. 1-15.

* cited by examiner

Higher Performance GEN1

| Received configuration information for other system components | | Acceptance configuration relative algorithm for other system components | | |
|---|---|---|---|---|
| | | For ECU A | For ECU B | For ECU C |
| Parameter Identifier | Value | Value | Value | Value |
| System Identifier | [Safety] | [Safety] | [Safety] | [Safety] |
| System Component Identifier | [ECU A] | No Reception | [ECU A] | [ECU A] |
| System Safety Generation | [GEN1] | N/A | [GEN1] | [GEN1, GEN2] |
| System Safety SubVariant | [HighPerf] | N/A | [HighPerf] | N/A |
| Mechatronics Variant | [A] | N/A | N/A | [A] |
| Com SW Variant | [X] | N/A | [X] | [X] |
| Parameter Identifier | Value | Value | Value | Value |
| System Identifier | [Safety] | [Safety] | [Safety] | [Safety] |
| System Component Identifier | [ECU B] | [ECU B] | No Reception | [ECU B] |
| System Safety Generation | [GEN1] | [GEN1] | N/A | [GEN1, GEN2] |
| System Safety SubVariant | [HighPerf] | [HighPerf, LowPerf] | N/A | N/A |
| Mechatronics Variant | [A] | N/A | N/A | [A] |
| Com SW Variant | [X] | [X] | N/A | [X] |
| Parameter Identifier | Value | Value | Value | Value |
| System Identifier | [Safety] | [Safety] | [Safety] | [Safety] |
| System Component Identifier | [ECU C] | [ECU C] | [ECU C] | No Reception |
| System Safety Generation | [GEN1] | [GEN1] | [GEN1] | N/A |
| Partial Network Variant | [PN-trcv] | N/A | [PN-trcv] | N/A |
| Com SW Variant | [X] | [X] | [X] | N/A |
| Parameter Identifier | Value | Value | Value | Value |
| System Identifier | [Safety] | [Safety] | [Safety] | [Safety] |
| System Component Identifier | [ECU X] | No reception | No Reception | N/A |

| Relative algorithm results | | |
|---|---|---|
| Compatible | Compatible | Compatible |
| System algorithm results | | |
| Compatible | Compatible | Compatible |

Fig. 23

Lower Performance GEN1

| Received configuration information for other system components | | Acceptance configuration relative algorithm for other system components | | |
|---|---|---|---|---|
| | | For ECU A | For ECU B | For ECU C |
| Parameter Identifier | Value | Value | Value | Value |
| System Identifier | [Safety] | [Safety] | [Safety] | [Safety] |
| System Component Identifier | [ECU A] | No Reception | [ECU A] | [ECU A] |
| System Safety Generation | [GEN1] | N/A | [GEN1] | [GEN1, GEN2] |
| System Safety SubVariant | [LowPerf] | N/A | [LowPerf] | N/A |
| Mechatronics Variant | [A] | N/A | N/A | [A] |
| Com SW Variant | [X] | N/A | [X] | [X] |
| Parameter Identifier | Value | Value | Value | Value |
| System Identifier | [Safety] | [Safety] | [Safety] | [Safety] |
| System Component Identifier | [ECU B] | [ECU B] | No Reception | [ECU B] |
| System Safety Generation | [GEN1] | [GEN1] | N/A | [GEN1, GEN2] |
| System Safety SubVariant | [lowPerf] | [HighPerf, LowPerf] | N/A | N/A |
| Mechatronics Variant | [A] | N/A | N/A | [A] |
| Com SW Variant | [X] | [X] | N/A | [X] |
| Parameter Identifier | Value | Value | Value | Value |
| System Identifier | [Safety] | [Safety] | [Safety] | [Safety] |
| System Component Identifier | [ECU C] | [ECU C] | [ECU C] | No Reception |
| System Safety Generation | [GEN1] | [GEN1] | [GEN1] | N/A |
| Partial Network Variant | [PN-trcv] | N/A | [PN-trcv] | N/A |
| Com SW Variant | [X] | [X] | [X] | N/A |
| Parameter Identifier | Value | Value | Value | Value |
| System Identifier | [Safety] | [Safety] | [Safety] | [Safety] |
| System Component Identifier | ECU X | No reception | No Reception | N/A |

| Relative algorithm results | | |
|---|---|---|
| Compatible | Compatible | Compatible |
| System algorithm results | | |
| Compatible | Compatible | Compatible |

Fig. 24

| Received result information for other system components | | Acceptance configuration system algorithm for other system components | | |
|---|---|---|---|---|
| | | For ECU A | For ECU B | For ECU C |
| Parameter Identifier | Value | Value | Value | Value |
| System Identifier | [Safety] | [Safety] | [Safety] | [Safety] |
| System Component Identifier | [ECU A] | No Reception | [ECU A] | [ECU A] |
| Relative algorithm result | [Compatible or Incompatible] | N/A | [Compatible] | [Compatible] |
| Parameter Identifier | Value | Value | Value | Value |
| System Identifier | [Safety] | [Safety] | [Safety] | [Safety] |
| System Component Identifier | [ECU B] | [ECU B] | No Reception | [ECU B] |
| Relative algorithm result | [Compatible or Incompatible] | [Compatible] | N/A | [Compatible] |
| Parameter Identifier | Value | Value | Value | Value |
| System Identifier | [Safety] | [Safety] | [Safety] | [Safety] |
| System Component Identifier | [ECU C] | [ECU C] | [ECU C] | No Reception |
| Parameter Identifier | Value | Value | Value | Value |
| System Identifier | [Safety] | [Safety] | [Safety] | [Safety] |
| System Component Identifier | [ECU X] | No reception | No Reception | N/A |
| Relative algorithm result | [Compatible or Incompatible] | N/A | N/A | N/A |

Fig. 25

Lower Performance GEN1

| Received configuration information for other system components | | Acceptance configuration relative algorithm for other system components | | |
|---|---|---|---|---|
| | | For ECU A | For ECU B | For ECU C |
| Parameter Identifier | Value | Value | Value | Value |
| System Identifier | [Safety] | [Safety] | [Safety] | [Safety] |
| System Component Identifier | [ECU A] | No Reception | [ECU A] | [ECU A] |
| System Safety Generation | [GEN1] | N/A | [GEN1] | [GEN1, GEN2] |
| System Safety SubVariant | [HighPerf] | N/A | [LowPerf] | N/A |
| Mechatronics Variant | [A] | N/A | N/A | [A] |
| Com SW Variant | [X] | N/A | [X] | [X] |
| Parameter Identifier | Value | Value | Value | Value |
| System Identifier | [Safety] | [Safety] | [Safety] | [Safety] |
| System Component Identifier | [ECU B] | [ECU B] | No Reception | [ECU B] |
| System Safety Generation | [GEN1] | [GEN1] | N/A | [GEN1, GEN2] |
| System Safety SubVariant | [lowPerf] | [HighPerf, LowPerf] | N/A | N/A |
| Mechatronics Variant | [A] | N/A | N/A | [A] |
| Com SW Variant | [X] | [X] | N/A | [X] |
| Parameter Identifier | Value | Value | Value | Value |
| System Identifier | [Safety] | [Safety] | [Safety] | [Safety] |
| System Component Identifier | [ECU C] | [ECU C] | [ECU C] | No Reception |
| System Safety Generation | [GEN1] | [GEN1] | [GEN1] | N/A |
| Partial Network Variant | [PN-trcv] | N/A | [PN-trcv] | N/A |
| Com SW Variant | [X] | [X] | [X] | N/A |
| Parameter Identifier | Value | Value | Value | Value |
| System Identifier | [Safety] | [Safety] | [Safety] | [Safety] |
| System Component Id | [ECU X] | No reception | No Reception | N/A |

| Relative algorithm results | | |
|---|---|---|
| Compatible | Incompatible | Compatible |
| System algorithm results | | |
| Incompatible | Incompatible | Incompatible |

Fig. 26

Higher Performance GEN2

| Received configuration information for other system components | | Acceptance configuration relative algorithm for other system components | | | |
|---|---|---|---|---|---|
| | | For ECU A | For ECU B | For ECU C | For ECU D |
| Parameter Identifier | Value | Value | Value | Value | Value |
| System Identifier | [Safety] | [Safety] | [Safety] | [Safety] | [Safety] |
| System Component Identifier | [ECU A] | No Reception | [ECU A] | [ECU A] | [ECU A] |
| System Safety Generation | [GEN2] | N/A | [GEN2] | [GEN1, GEN2] | [GEN2] |
| System Safety SubVariant | [HighPerf] | N/A | [HighPerf] | N/A | N/A |
| Mechatronics Variant | [A] | N/A | N/A | [A] | [A] |
| Com SW Variant | [X] | N/A | [X] | [X] | [X] |
| Parameter Identifier | Value | Value | Value | Value | Value |
| System Identifier | [Safety] | [Safety] | [Safety] | [Safety] | [Safety] |
| System Component Identifier | [ECU B] | [ECU B] | No Reception | [ECU B] | [ECU B] |
| System Safety Generation | [GEN2] | [GEN2] | N/A | [GEN1, GEN2] | [GEN2] |
| System Safety SubVariant | [HighPerf] | [HighPerf, LowPerf] | N/A | N/A | N/A |
| Mechatronics Variant | [A] | [N/A] | N/A | [A] | N/A |
| Com SW Variant | [X] | [X] | N/A | [X] | [X] |
| Parameter Identifier | Value | Value | Value | Value | Value |
| System Identifier | [Safety] | [Safety] | [Safety] | [Safety] | [Safety] |
| System Component Identifier | [ECU C] | [ECU C] | [ECU C] | No Reception | [ECU C] |
| System Safety Generation | [GEN2] | [GEN2] | [GEN2] | N/A | [GEN2] |
| Partial Network Variant | [PN-trcv] | [N/A] | [PN-trcv] | N/A | N/A |
| Com SW Variant | [X] | [X] | [X] | N/A | [X] |
| Parameter Identifier | Value | Value | Value | Value | Value |
| System Identifier | [Safety] | [Safety] | [Safety] | | [Safety] |
| System Component Identifier | [ECU D] | [ECU D] | [ECU D] | | No Reception |
| System Safety Generation | [GEN2] | [GEN2] | [GEN2] | | N/A |
| Partial Network Variant | [PN-trcv] | [N/A] | [PN-trcv] | | N/A |
| Com SW Variant | [X] | [X] | [X] | | N/A |
| Parameter Identifier | Value | Value | Value | Value | Value |
| System Identifier | [Safety] | [Safety] | [Safety] | [Safety] | [Safety] |
| System Component Identifier | ECU X | No reception | No Reception | N/A | No Reception |

| Relative algorithm results | | | |
|---|---|---|---|
| Compatible | Compatible | Compatible | Compatible |
| System algorithm results | | | |
| Compatible | Compatible | Compatible | Compatible |

Fig. 28

METHOD AND SYSTEM FOR VEHICLE PLATFORM VALIDATION

CROSS-REFERENCE TO RELATED APPLICATION

The present patent application/patent claims the benefit of priority of co-pending EP17178604.9, filed on Jun. 29, 2017, and entitled "METHOD AND SYSTEM FOR VEHICLE PLATFORM VALIDATION," the contents of which are incorporated in full by reference herein.

TECHNICAL FIELD OF THE INVENTION

The invention relates to a method and a system for evaluation of compatibility of software (SW) and hardware (HW) components in a vehicle platform.

BACKGROUND

When a vehicle designer makes changes in the software and/or hardware of a series of vehicles it is beneficial to evaluate whether these changes are compatible with the existing vehicles before the changes are made. This series of vehicles may belong to the same or different vehicle platforms. Such compatibility checks are for example needed when designing a new vehicle model or when making changes to an existing vehicle model.

In the aftermarket, there is also a need for compatibility check both when it comes to vehicle reparation and continuous updates to software in the vehicle. For instance, when a software update is pushed out to a vehicle there is a need for compatibility check to ensure that the vehicle will be fully operational after the update. Also when hardware parts are changed on a vehicle there is a need to check compatibility with the rest of the vehicle to prevent malfunction.

Compatibility check is also needed in in-vehicle systems, vehicle-to-vehicle systems and in vehicle-to-infrastructure systems. An example of a vehicle-to-infrastructure system can for instance be an intersection or a geographical advertisement in the infotainment system of a vehicle.

The most common way of ensuring a compatible part configuration cross development to assembled vehicles, is to make use of one corporate product structure. The corporate product structure is the main (often only) structure which manages Variation Points, Variation rules, and holds the single truth of what is compatible. The corporate product structure, traditionally have a manufacturing, and material sourcing focus, which makes it is well suited to select parts, based on an variation point string and made up of attributes and features, but less suited for resolving compatible issues driven from the engineering/solution domain, especially from a SW and mechatronic perspective. The Corporate Product Structure, is typically reflected in an R&D structure and different manufacturing structures, and ultimately reflected also in an Aftermarket structure. Each of these structures, usually allows some means of manipulation, as introduction of a new Variants or variant rules for a specific purpose, manipulation of time, or other minor differences. Basically these updates are "add ons", based on "the one existing" corporate product structure. The corporate product structure is the basis configuration and complexity management for the complete product lifecycle management. Each engineer, inserting a variant or/and a variant constraint in some aspect, is therefore responsible for documenting the constraint, using the variation points and variants defined in the corporate product structure. In e.g. a modern complex electrical platforms, with thousands of parts, this transformation of variation points, variants and constraints from a domestic structure to a corporate structure are highly challenging, and the risk for incorrect defined variants and rules are high, and there is a risk that it will become unmanageable. According to one solution, an engineer can minimize the number of variation points and variants, by choosing an appropriate generic structure and doings so greatly reduces the complexity of the design and the maintenance of the design. Alternatively or additionally, in an effort to keep the number of variation points to a manageable amount, re-use of already existing variation points with additional complex variation rules are usually practiced. The result is a variation point and rule set, which targets manufacturing. However, to reflect these variation points, variants and dependencies in a downstream structure, based on different generic structure, with a different set of variation points is a challenge. Moreover, overtime, with "Carry over" and "Carry back" scenarios of solutions, cross different vehicle programs, quality might be impaired, and there is even a risk that vehicles might be built or updated with an incompatible solution.

SUMMARY OF THE INVENTION

It is an object of the present invention to provide an enhanced method of evaluation of compatibility in an automotive system.

According to a first aspect of the invention, this and other objects are achieved by a method of evaluating compatibility of a first system component of a vehicle platform, the method comprising the steps of: providing a database comprising: vehicle platform configuration information comprising configuration information about two or more vehicle models (vehicle configurations), wherein each vehicle model comprises one or more aspect domains aspect structure wherein the aspect structure comprise of aspect domains, wherein each aspect domain comprises one or more system components, wherein each system component comprises configuration information, wherein each configuration information comprises a set of one or more parameter values; wherein at least one system components of two different vehicle models belong to the same aspect domain; wherein at least one of the number of aspect domains of each vehicle model and the number of system components of each aspect domain structure of the vehicle model is twenty or more; determining a compatibility result between the first system component and at least one other system component in the vehicle platform by comparing the configuration information of the first system component to the configuration information of the at least one other system component, wherein the set of one or more parameter values in the configuration information of the first system component is compared to the set of one or more parameter values in the configuration information of the at least one other system component to determine if the sets of parameter values have at least a compatible parameter value; wherein optionally a positive compatibility result is only determined for those of said at least one other system component that is not the same, or that is not the same system component instance, as said first system component; and returning a compatibility result based on if the first system component is determined to be compatible with the at least one other system component.

In relation to this invention the term the meaning of the term "evaluating compatibility" is basically to determine whether the "first system component" is "compatible/valid" or "incompatible/invalid" with at least one other "system component" in said vehicle platform, as is explained in more detail below.

In relation to this invention the term vehicle platform refers to a shared set of common design, engineering, and production efforts, as well as major components over a number of distinct models and even types of vehicles, often from different, but related marques. The term model is then arbitrary used to distinguish different configurations of system components, within the vehicle platform, defining a compatible sets of system components, valid for a specific set of compatibility conditions. It is practiced in the automotive industry to reduce the costs associated with the development of products by basing those products on a smaller number of platforms. This further allows companies to create distinct models from a design perspective on similar underpinnings.

Said database comprises said at least one system component and preferably also said first system component, wherein said at least one system component and said first system component belongs to the same or different vehicle models and/or aspect domains.

Configuration information may be divided into 2 sets. The first set is the configuration information relating to which valid variant combination is to be selected for a specific feature definition. This feature set is commonly defined as the Global feature Library. The second set is the configuration information which defines and resolves technical compatibility (SW to HW constraints, SW functional constraints, Mechatronic constraints, or other). Typically one or several structures, are used in order to de-couple (separation of concerns) different areas of the vehicle platform in order to minimize and manage different type of constraints. Example: A structure used to define and calculate the optimal frame packing scheme, is based on a network oriented structure. Two different frame compilations depicted such a structure will inflict constraints (incompatible combinations) in all parts in which uses these compilations. In order to resolve functional dependencies, a functional oriented structures are more suitable. More than one type of technical constraint can be resolved in one structure. The cost of this, however is often an increase in configuration parameters and configuration rules.

Aspect Domain refers to a specific generic module in a structure which resolves a specific type of constraint(s). Variants of such module consists of groups of system components relating to certain functionalities in the vehicle platform, such as propulsion systems, safety systems, locking systems and so on. System components are SW and HW components and associated objects describing the requirements, design, implementation and final parts, needed to define, design, implement, integrate, build and maintain one or several vehicle models in the vehicle platform, and can for instance, in a safety system, be a restrainer for a safety belt.

In relation to this invention the term "compatibility result" denotes the result of the compatibility testing or the output from the algorithm e.g. that a first system component and a second system component are incompatible with each other, or that a first system component and a second system component are compatible with each other. According to one example the capability result is either compatible or incompatible.

In relation to this invention the term "a positive compatibility result" is used to denote a compatibility result that means compatible or valid, i.e. neither incompatible nor invalid. Additionally, in relation to this invention the term "a negative compatibility result" is used to denote a compatibility result that means incompatible or invalid, i.e. neither compatible nor valid.

In relation to this invention "two system components are the same" or "two system components are the same system component instance" when both relates to the same instance of this system component. A display and a camera are e.g. not the same system component/system component instance, whereas the same display software from two different releases constitute the same system component/system component instance. Another example, when a first rear view camera (first system component) is to replace a second rear view camera (a second system component); the two rear view cameras are the same system component/system component instance.

Additionally or alternatively, a negative compatibility result is always determined for those of said at least one other system component that is the same, or that is the same system component instance, as said first system component. This is e.g. in line with the purpose of determining which system components are suitable for each other, such as determining a suitable pair of a display and a camera as defined by a range of configuration information.

According to one example, said configuration information of said system component comprises context specific vehicle configuration information and/or said configuration information comprises content configuration information.

In relation to this invention "context specific vehicle configuration information" is configuration information that relates to something different than the standard or protocol used when two devices communicate with each other, (which may be referred to as protocol configuration information or protocol compatibility). Instead it I may e.g. comprise vehicle configuration information relating to the geographical context and/or technical context as explained below. Additionally or alternatively configuration information and/or said context specific vehicle configuration information may comprise content configuration information.

In relation to this invention content configuration information is e.g. not the format of the information such as 8-bits or 16-bits, but how the information content should be configured to be operational (e.g. including being analysed correctly) with the other system components. The aspect ratio of an image is one example of content configuration information, more examples are given in the detailed description.

In the automotive industry there are numerous requirements in play. There are legal constraints relating to e.g. automotive safety that varies from country to country (e.g. total weight of the vehicle, number of seats and/or air bag requirements); there are technical constraints (such as required space for installation, required energy at operation, required torque and/or temperature tolerance) that put restrictions on which system components that may be used together; there are design constraints (such as comfort level, maximum speed, material such as textile, plastic) that are set differently for different car models. Consequently, when e.g. one system component is to be exchanged, it is essential to determine that it communicates according to the same protocol as the old one (protocol compatibility), However, it would also be useful to determine that it is capable of operating in the same context as the old one, with respect to e.g. geographical context (legal constraints and/or user constraints such as language), technical context (technical constraints and/or design constraints).

Generally, in automotive systems it is common to have distributed functionality implemented in several electronic control units (also known as ECU:s). However, a more generic term for describing distribution, is module. Using this term an ECU will be a leaf module in a topology oriented module structure. The modules have interfaces (signal, service, mechatronic, or other).

Many customer and system functions are realized by SW in modules. During system design, changes in the system functions often result in changes in the communication need between modules, causing variants of the system. This also frequently happens between model years. Therefore, there can be several version (version refers to both variant ID and revision ID) of the SW for a specific module depending on functional variant and communication needs of the module.

If the functionality of each SW have different communication needs (semantics) in relation to another module it can be important to identify that the SW used in all modules that implement a function with inter-module communication are compatible with each other. SW modules residing on different ECUs, transmit and receive communication signals, using networks which interconnects the ECUs. In order to correctly execute a vehicle function, SW modules, mechatronic interface and signal interface need to be compatible. For many of the communication network types the communication signals are located in defined transportation containers called frames. The frames can be uniquely identified by a frame identifier.

Since more than one frame may be needed to transport the complete set of communication signals, it is important that a transmitter and receiver are configured to use the same frame identifiers. A module is typically expected to receive part of all the frames transmitted by other modules.

If frame identifiers that the modules SW is configured for are not identical between transmitters and received the then modules can normally not identify such a mismatching situation themselves. In case the modules do not have configuration that is identical between transmitter and receiver, the expected communication signals will not be received, or a frame intended to be received by another module is received instead.

The modules can be configured to have incompatible sets of HW and SW if an incorrect SW or HW is used. It can be important to determine whether a configuration was an intended variant or is an incompatible configuration. An incompatible configuration may impose a risk for permanent HW damage, undefined system function, impaired system function or no system function at all. For example, the content of a frame may be misinterpreted as 'open side window' while the driver actually requested 'close side window', or a 'close side window' request may be completely ignored.

Communication between modules may be based on service oriented communication where modules or system components communicate with each other their functionality available to the system. Communication paths between modules or system components can be statically established at design-time, and dynamically at startup-time or at runtime. This communication between system components is not identified by frame identifiers but instead uses a service identifier to uniquely identify the service or function.

The design and the selected variation points of the construction of a vehicle and a vehicle electrical system can be described with the use of aspects. Each aspect typically resolves a need, such as, provide a product advantage, manage inbound and outbound logistics for manufacturing, steer and control engineering or keep track of system constraints in a regression engineering process and later in a product lifecycle management perspective.

A number of structures resolving one or more such aspects are typically kept throughout an automakers organisation (R&D, Manufacturing, Sales, Aftermarket) and are engineered and maintained by specialists.

Examples of such aspects within the Electrical Engineering arena are:
Selectable customer Features & Attributes
    Intended use
        To provide Product definition—Requested features/attributes/customer functions to be engineered
        To provide Product specification, sales offer vs selected part configuration to be (in the end) assembled in factory
Interfaces between systems, control units, in-vehicle network communication protocols
    Intended use to define valid interface definitions with respect to distributed Interfaces cross a number of ECUs
Mechatronic
    Intended use to define valid and compatible combinations of ECUHWs, sensors, actuators and buses
Functional
    Intended use to define valid and compatible combinations of ECU allocated and distributed functional SW units, which enables correct execution of vehicle functions The aspects listed in the examples (of such aspects within the Electrical Engineering arena) above are all examples of aspect domains.

In an ever more increasing technical complex electrical system platform, the number of ECUHWs, system buses, functions etcetera vs the bandwidth between low-end and high-end offers, and the pressure to offer cost effective products, a greatly increased number of variants, and most importantly, there exists a huge number of buildable but incompatible variant combinations, if not correctly prohibited by product lifecycle management systems as enabled by the invention.

In combination, the manufacturing process of a vehicle from an electrical engineering perspective, is under change. Previously, a vehicle, as ordered from customer and built in factory, were more or less fixed from a feature, attribute and construction perspective. When leaving the factory, only minor updates such fault corrections and minor aftermarket feature updates (example tow hook) were performed on the vehicle.

The automotive industry are approaching a "continuous build oriented process" where both features and attributes as well as construction can be constantly updated throughout the vehicles lifecycle. This implies that an automaker also needs to keep track of each unique vehicle from multiple perspectives. An engineering perspective, securing a compatible solution, where no system constraints are violated. A technical functional perspective, where a vehicle unique set of function are able to execute correctly, in the context of selected solution (parts), and ultimately that selected customer features and attributes are correctly performed, with regards to selected solution and technical functions. This need to be correctly documented throughout the vehicles lifecycle to ensure that new introduced features, attributes or customer functions potentially do not violate any system constraints defined by engineering solution or, that a updated engineering solution, introduces a incompatibility, with respect to the technical functions that are expected to be executed, or that expected customer features still are delivered in an expected fashion. Ultimately, any introduced inconsistency could cause mal functional of the vehicle.

As explained below, the installation of a system component may result in a fully operational vehicle and yet be unsuitable e.g. from a legal or safety perspective. Hence, the invention enables to retrieve a response to not only the question if two system components are capable of communicating with each other, but also to the question if it is suitable to add a particular first component to a vehicle.

The number of parameter values in each set of parameters may be one or more. Alternatively, the number of parameter values in each set of parameters may be two or more.

The step of determining a compatibility result between the first system component and at least one other system component in the vehicle platform may comprise using identifiers, to which each set of parameter values is related, to determine which set of parameter values in the configuration information of the first system component to compare to which set of parameter values in the configuration information of the at least one other system component.

The step of determining a compatibility result between the first system component and at least one other system component in the vehicle platform may further comprise comparing a plurality of sets of parameter values in the configuration information of the first system component to a plurality of sets of parameter values in the configuration information of the at least one other system component to determine if each compared pair of sets of parameter values have at least a compatible parameter value between them.

The step of determining a compatibility result between the first system component and at least one other system component in the vehicle platform may further comprise determining a compatibility result between the first system component and all other system components in a vehicle model.

By determining whether the system component is compatible or incompatible with all other system components in the vehicle model it can be determined for the system component locally whether it is compatible with the rest of the system.

The method may further comprise a step of determining a compatibility result between the first system component in the vehicle platform and a system master by comparing a configuration information of the first system component to a configuration information of the system master, wherein a set of parameter values in the configuration information of the first system component is compared to a set of parameter values in the configuration information of the system master to determine if the sets of parameter values have at least a compatible parameter value between them, and wherein the step of returning a compatibility result is based on if the first system component is determined to be compatible with the at least one other system component and with the system master.

If the result incompatible is returned, the method may further comprise a step of determining that the cause of the incompatibility lies in the first system component if the first system component is determined to be incompatible with the system master, otherwise determining that the cause of the incompatibility does not lie in the first system component.

By determining if the cause of incompatibility lies within the first system component itself, it can be decided what actions to perform in order to prevent malfunction.

The method may be executed locally in the first system component and the method may further comprise a step of disabling the first system component if the result incompatible is returned. Furthermore, the compatibility result may be stored locally in the first system component until a new compatibility result is acquired.

According to one example the database is distributed on several instances which are arranged spatially separated from each other or remote from each other, where each instance has a respective portion of the database, which portions may be mutually excluding or partly overlapping. According to one example, the database is distributed in a number of vehicles, and optionally on several storages spaces in each vehicle.

According to one example, the database is partly or fully distributed in a plurality of vehicles. I.e. the database is distributed over several vehicles, which may belong to a plurality of different of different vehicle models and/or different makes, where each vehicle has a respective portion of the database, which portions may be mutually excluding or partly or fully overlapping. When the database is partly distributed in a plurality of vehicles, a portion of the database may be arranged in an instance which is not a vehicle, e.g. the cloud etc. This enables that the individual vehicle may answer the question whether it is compatible with a certain system component, e.g. before installation of this component in the vehicle.

According to one example the database is distributed among the system components and a respective part of the database is optionally compiled in the software a respective system component.

By disabling the system component in case of incompatibility malfunction may be avoided. Storing the compatibility result in the system component itself may further enable for decisions such as disabling and enabling of the system component to be performed locally.

According to another embodiment of the invention, there is provided a method of executing the compatibility evaluation method for all system components in a vehicle model, further comprising a step of determining that the vehicle model is compatible if all system components return the result compatible, otherwise determining that the vehicle model is incompatible.

By executing the method for all system components a result on compatibility is acquired for the complete vehicle model including all system components. It can also be decided in what system component, or system components, the cause of the incompatibility lies and proper action can be taken to prevent malfunction of the vehicle.

It is basic knowledge that many vehicles such as e.g. cars have two start-up stages. An initial stage ending with that the electronics is on and the engine is off; and a later stage ending with that both the electronics and the engine are on. When the car has not yet reached the end of the later stage, this is referred to as the car being after start-up of the vehicle and under a reduced functionality condition.

The method may be performed prior to a start-up of a vehicle system, and an identified incompatibility may prevent the start-up of the vehicle. Alternatively, the method may be performed inside or within a predetermined time interval after a start-up of the vehicle system and incompatibility forces a shut-down of the vehicle. After a start-up the vehicle system may run with reduced functionality until the method has returned the result compatible.

By performing the compatibility evaluation before start-up or directly upon start-up, optionally during running of the vehicle system with reduced functionality, the risk of malfunction in the vehicle is reduced.

The method may further include a further step of, if any system component does not communicate within a predetermined time interval after being ordered to execute the method, determining incompatibility of the system component.

The method may further comprise a step of, if the vehicle model is determined to be incompatible, evaluating if there are alternative configurations available in the vehicle model and if so, acquire a next configuration for the vehicle model and repeating the method until compatibility is achieved or until the method has been completed for all configurations of the vehicle model.

By testing a number of configurations the vehicle can identify a compatible configuration and adjust to the configuration to avoid malfunction of the vehicle while still enabling the vehicle to run.

The first system component may for instance be an electronic control unit.

According to a second aspect of the invention, there is provided a system for evaluating compatibility of a first system component of a vehicle, the system comprising: a database comprising: vehicle platform configuration information comprising configuration information about two or more vehicle models, wherein each vehicle model comprises one or more aspect domains, wherein each aspect domain comprises one or more system components, wherein each system component comprises configuration information, wherein each configuration information comprises a set of one or more parameter values; wherein at least two system components of two different vehicle models belong to the same aspect domain; wherein at least one of the number of aspect domains of each vehicle model and the number of system components of each aspect domain of said vehicle model is twenty or more; a processor configured to receive: configuration information (12) of a first system component and configuration information (11) of at least one other system component, and configured to based on said received information determining a compatibility result between said first system component and at least one other system component in said vehicle platform by comparing the configuration information (12) of said first system component to the configuration information (11) of said at least one other system component, wherein the set of one or more parameter values (19a) in the configuration information (12) of said first system component is compared to the set of one or more parameter values (18a) in the configuration information (11) of said at least one other system component to determine if said sets of parameter values (18a, 19a) have at least a compatible parameter value; and configured to: returning a compatibility result based on if said first system component is determined to be compatible with said at least one other system component.

The system components of the vehicle model may all be part of a single vehicle. Alternatively, one or more system components of the vehicle model may not be part of the vehicle. The vehicle model may also comprise system components from more than one vehicle.

The system components of a vehicle platform, which can for instance be modules connected by a communication network, can be interconnected between each other, why there is a need to verify compatibility both between the system components and the system master as well as compatibility between system components. The system master may for instance be a module in the vehicle platform assigned the role of being a reference for all other modules.

For example, for a door locking system it is important to know how many doors the vehicle have, so a door number information is sent from a centralized master to the door locking system. Another example of important information for a vehicle model is tire circumference, which is important for speedometer and cruise control system.

The meaning of system components being compatible with each other is that can be the system components are configured so that both transmitting and receiving system components have the same assumption about how the communication signals are transported on the network and what information the communication signals do represent. Another meaning of being compatible is that each system components have functionality that is designed to operate together.

The invention can be used in the platform development, i.e. in the electrical engineering design and integration. It can also be used in the manufacturing of vehicles, as well as in the aftermarket.

Examples of applications in the design are system life cycle design, variant design and evaluation of compatible or incompatible variants. In the integration examples of applications are vehicle integration, boxcar integration and test rig integration. In vehicle integration it can be determined to which vehicles a new component shall be deployed. Vehicles can also be set to subscribe to new components according to which components are compatible to the specific vehicle.

In the aftermarket, there is a need for compatibility check both when it comes to vehicle service and updates to software in the vehicle. For instance, when a software update is pushed out to a vehicle there is a need for compatibility check to ensure that the vehicle will be fully operational after the update. Also when hardware parts are changed on a vehicle there is a need to check compatibility with the rest of the vehicle to prevent malfunction.

The invention can also be used in the context of car pools, in-vehicle systems, vehicle-to-vehicle systems and vehicle-to-infrastructure systems. An example of a vehicle-to-infrastructure system can for instance be an intersection where the vehicle can communicate with the intersection infrastructure, a geographically based advertisement, or a tourist advertisement.

Updates and upgrades over the air can be sent to a vehicle, which can for instance include updates from the original equipment manufacturer (OEM), third party updates and customer app customizations.

Main use (UC) cases for the invention includes the following:

Main UC1: Use the dedicated configuration information and related objects, in order to continuously update parts of a given subsolution, in an orderly fashion, and correctly and knowingly insert or avoid inserting new constraints (and so introduce incompatibility) in existing product portfolio. In doing so, continuous validations in (for example) design scenarios are required.

Main UC2: Use the dedicated configuration information and related objects in order to semantically transfer valid compatible updates of solutions, or parts of updates in downstream engineering activities/tooling, for further analyzing of impact in other/older models (carry over and carry back).

Main UC3: To be able to correctly integrate and verify, valid and compatible combinations of modules in a vehicle platform, not only based on a corporate feature dictionary, but also based upon different sets of system constraints. Especially useful in an integration and verification scenario when continuous updates of selected information objects are needed (feature variants do not increase, due to a possible system constraint for specific solution is introduced).

Main UC4: In a manufacturing situation, a given factory have in stockpile different versions of delivery parts (use up vs logistics), for same vehicle model. When it comes to SW or/and baselines of SW, the factory perform SW download in factory line. To ensure correct set of SW, after leaving factory, indifferent to specific factory situation, validity and compatible controls, ensures correct SW downloaded versions, when leaving factory.

Main UC5: Ensurment of correct updated vehicles in an aftermarket situation, where only a subset of the complete set of SW parts can be loaded at one instance. Example of this UC, is when performing bugfixes, or loading large SW parts (example maps). When loading large SW files, the complete file is broken down to a number of "delta files". When performing an update, only, the changed delta files will be uploaded.

Main UC6: Performing "feature updates" (example enhancement from an D4 to D5 engine), in an aftermarket scenario. This is desired to increase the retail price of used vehicles. When performing such updates both offline and in-vehicle compatibility checks/controls need to be undertaken.

Main UC7: A number of SW parts have been compiled/created in such away, that the binary consists of at least two different function sets, which are mutual exclusive. The reason for this is the same SW part is to be sourced for a HW unit, existing in two different configurations with two different functional environments. The resolvement of which configuration is to run, is made when starting the vehicle, bind-time during initialization. In-vehicle validations, are then needed to ensure compatibility.

In essence, the invention targets the areas:
1. Definition of Configuration framework, which supports multiple generic structures, optimizing the management of dependencies cross the different phases the product lifecycle. By choosing a correct structure for a specific purpose, the number and type of dependencies can be minimized, and so reduce the complexity to be managed over time,
2. Methods:
Of how to define the configuration framework, how to define and resolve dependencies, both in PLM tooling, involving R&D tooling, manufacturing tooling, aftermarket tooling, and resolvement in specific vehicle (offline and online, configuration resolution, dependent on previous, defined configuration framework and methods),
3. Algorithms, to check and ensure, compatible product configurations, in PLM tooling and in vehicle.

The invention defines a framework for configuration, methods and algorithms to ensure compatibility and detect incompatibility issues, in all R&D phases, manufacturing phase, maintenance phase and in operation/update phase of vehicle systems, vehicles and platforms.

Phrased differently, the invention enables improvements in at least 4 major areas of vehicle engineering and more specifically of electrical engineering and the lifecycle of the electrical platform:
1. A definition of a configuration framework on how to define and maintain variation points, variants and variant rules, managing engineering system constraints. This with respect to chosen system engineering and system engineering variant strategies, driven from multiple (R&D) product structures (example driven from mechanical engineering, Mechatronic Engineering and SW Engineering).
2. A framework of methods on how to provide sufficient semantics of valid Variation points, variants and variant rules defining the compatibility of different engineering solution, based on different "aspects" example:
    a. Compatibility of Mechatronic Engineered solutions
    b. Compatibility of EE Mechatronic Engineered solutions
    c. Compatibility of SW Engineered solutions
    d. Compatibility between Mechatronic, EE mechatronic and SW solutions
    e. Fulfillment of customer requested functions
    All aspects may be based on different generic structures.
    To be used e.g. in Integration scenarios, when performing R&D verification, at Manufacturing and aftermarket updates of vehicle systems. Ensuring system validation of correct compatible part configurations, according to defined system constraints. This also includes defining how EE R&D objects relates to electrical engineering parts, perform validation of documented system constraints defined in EE development phase vs manufacturing, and aftermarket structures.
3. Definitions and methods on how to select buildable parts based on one structure vs how to verify compatibility versus one or several aspects defined in different structures example:
    a. Use a Corporate Product structure selecting a "Bill Of Materials" (BOM), in manufacturing vs Verification of compatibility of selected BOM, from a solutions perspective
    b. When updating a vehicle, read out Mechatronic, EE mechatronic, and SW (engineering) solutions of the vehicle, update the vehicle based on solution
    c. When updating a vehicle, read out Mechatronic, EE mechatronic, and SW (engineering) solutions of the vehicle, show complete range of technical functions and customer features, which solution set offers, (including inactive functions and customer features), as the basis for additional customer offer (example in aftermarket scenario)
    d. When updating a vehicle, read out Mechatronic, EE mechatronic, and SW (engineering) solutions, verify which engineering systems need to be updated, to fulfil an additional customer features, if current installed system solutions are inadequate
4. Definition of concept on how to provide/download system constraint information to the vehicle in order to perform in-vehicle validation controls in a continues-build process.
5. Definition of algorithms how to perform off-board and in-vehicle (on-board) validation controls:
    a. Compatibility of Mechatronic Engineered solutions
    b. Compatibility of EE Mechatronic Engineered solutions
    c. Compatibility of SW Engineered solutions
    d. Compatibility between Mechatronic, EE mechatronic and SW solutions
    Fulfillment of customer requested functions.

The invention offers means for performing both "off board" and "on board" compatible controls cross multiple vehicle systems (and parts), which is highly needed in relation to e.g. modern complex electrical platforms, with thousands of parts, the transformation of variation points, variants and constraints from a domestic structures to a corporate structure.

The automakers are also targeting new revenue streams. One new revenue stream is to offer new features to existing owners. This implies that "every day" can be a new "manufacturing day" for a specific vehicle. Today traditionally tools and process to manage this are at best very limited.

The ability to cross validate the output from a corporate product structure in different lifecycle phases such as, System Integration, Manufacturing, After market, vs local configuration structures greatly improves not only the flexibility to perform updates (in new and existing vehicles), but also the quality and functionality of the vehicle.

BRIEF DESCRIPTION OF THE DRAWINGS

The present invention will be described in more detail with reference to the appended drawings, showing currently preferred embodiments of the invention.

FIG. 23 is an example of compatible variant information for the relative algorithm of "higher performance safety system", GEN1.

FIG. 24 is an example of compatible variant information for the relative algorithm of "lower performance safety system", GEN1.

FIG. 25 is an example of compatible variant information for the system decisions for all versions of safety system GEN1.

FIG. 26 is an example of incompatible variant information, module from higher performance system put in lower performance system, GEN1.

FIG. 28 is an example of variant information "higher performance safety system", GEN2. As illustrated in the figures, the sizes of layers and regions may be exaggerated for illustrative purposes and, thus, may be provided to illustrate the general structures of embodiments of the present invention. Like reference numerals refer to like elements throughout.

DETAILED DESCRIPTION

Figure 29:
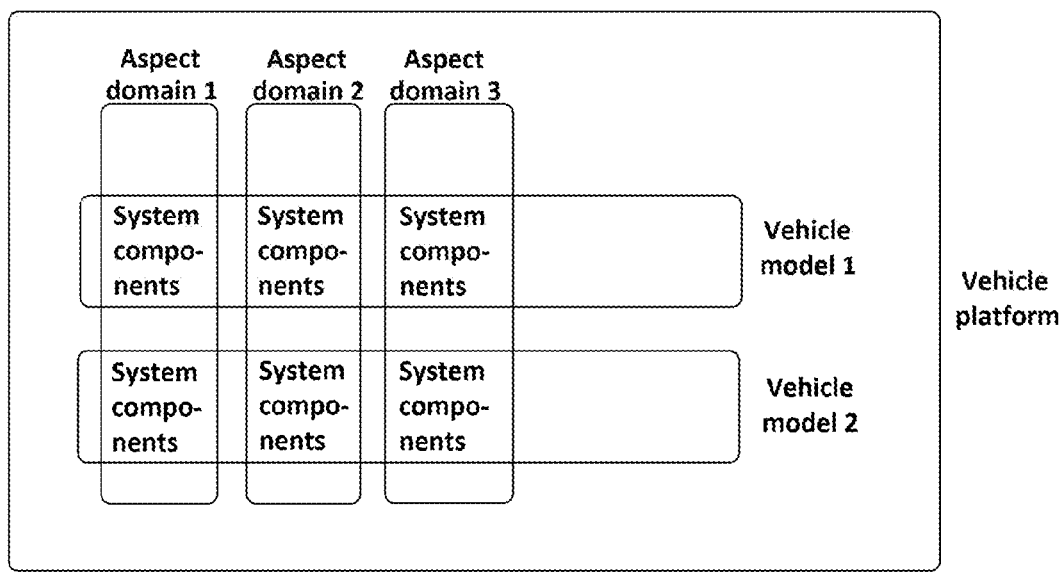
FIG. 29 is an illustration of a vehicle platform.

FIG. 29 shows an illustration of a vehicle platform with two vehicle models and a number of aspect domains. Each vehicle model comprises a number of system components in each aspect domain. The figure is only an illustration of a substantially simplified vehicle platform, as a platform typically comprises a large number of system components. There might be a wide range of vehicle models in a vehicle platform, and there are countless combinations of system components comprised in the different aspect domains. Therefore, there is a need to ensure compatibility for a wide variety of combinations of system components in the plurality of aspect domains.

For instance, there are modifications regarding engine performance packages, safety packages, infotainment packages, etc. There are also regional differences to be accounted for, such as vehicle-to-infrastructure solutions specific to different regions, and local regulations and market preferences that require different solutions when it comes to the different aspect domains. The system components in the aspect domains are subject to changes, such as hardware replacements and continuous software updates, and there is therefore a need for compatibility evaluation between the system components.

Figure 30:
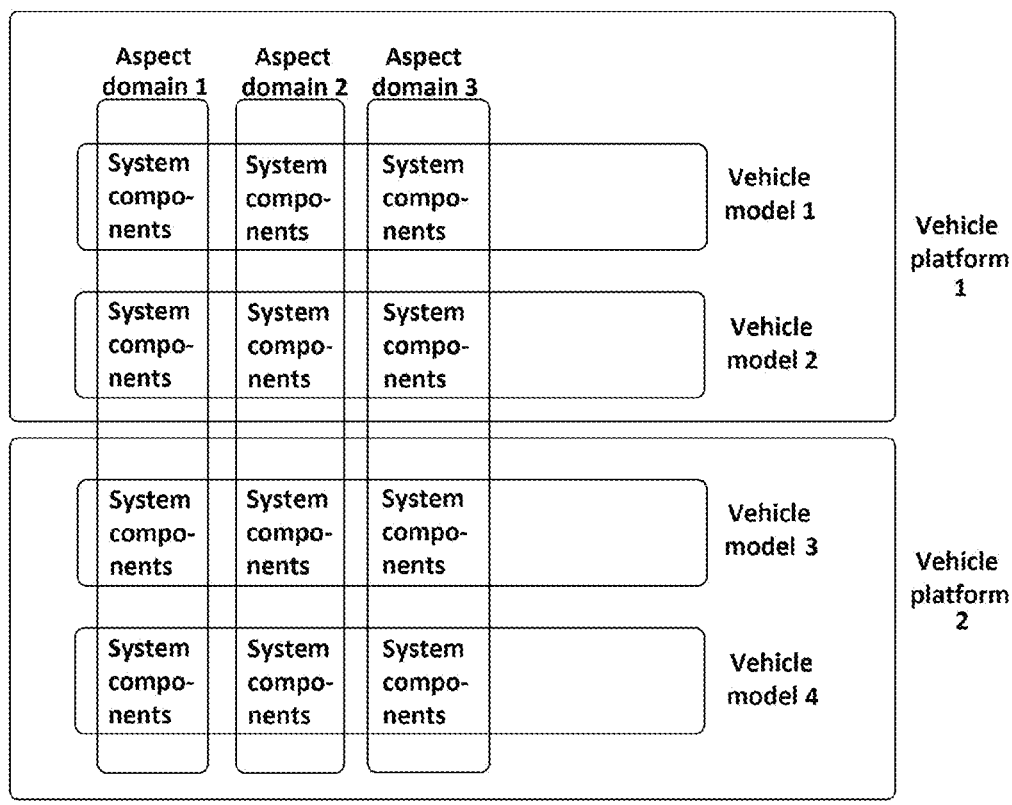
FIG. 30 is an illustration of two vehicle platforms.

FIG. 30 shows two vehicle platforms similar to that in FIG. 29. The two vehicle platforms comprise the same aspect domains and the vehicle platforms share the same methodology of system component compatibility evaluation.

A number of detailed examples will be shown which emphasize on different aspects, one at a time, of valid and invalid (compatible or incompatible) vehicle systems. In a real vehicle design there may be many additional aspects involved for each system and system component. To facilitate the reading many of the examples have been simplified and the number of system components, parameters and parameter values are fairly limited, in practice the number of system components, parameter and parameter values are normally vast.

Figure 31:
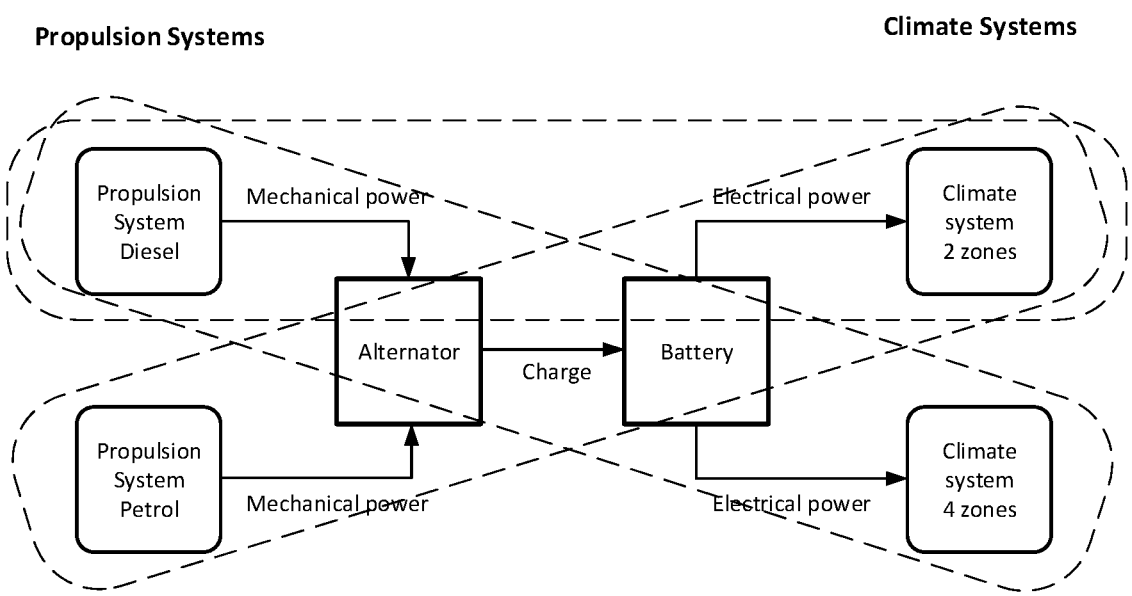
FIG. 31 is an illustration of compatible and incompatible system combinations of climate systems and propulsion systems.
Figure 32:
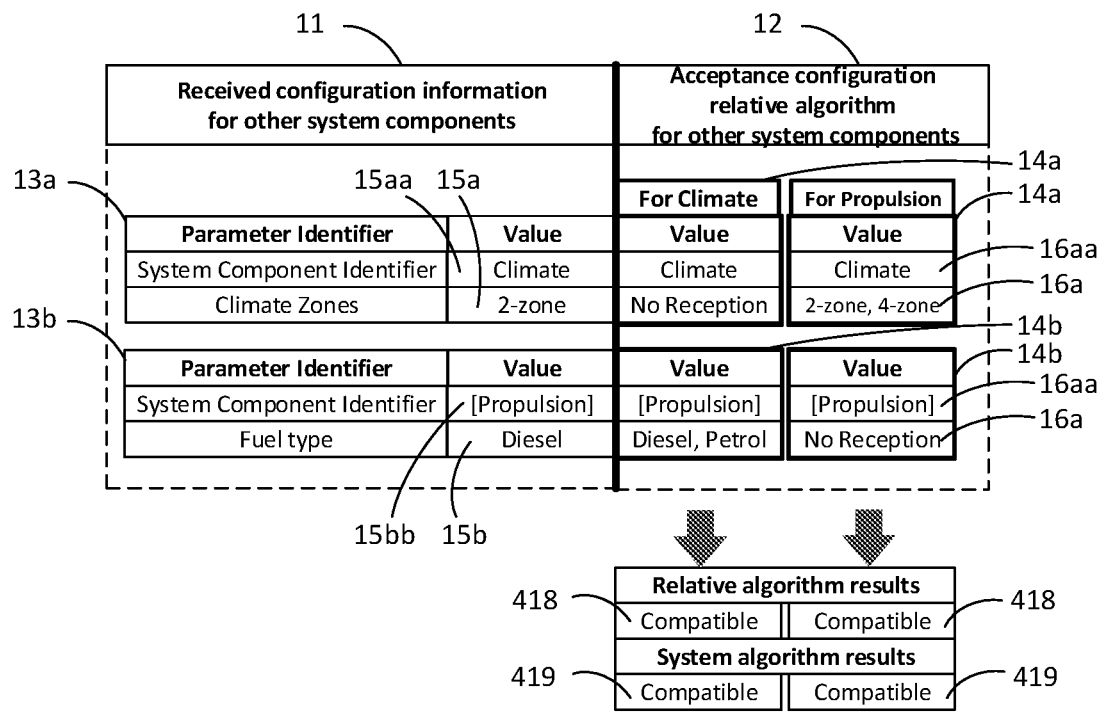
FIG. 32 is an illustration of algorithm structure of a compatible configuration of the climate and propulsion system shown in FIG. 31.
Figure 33:
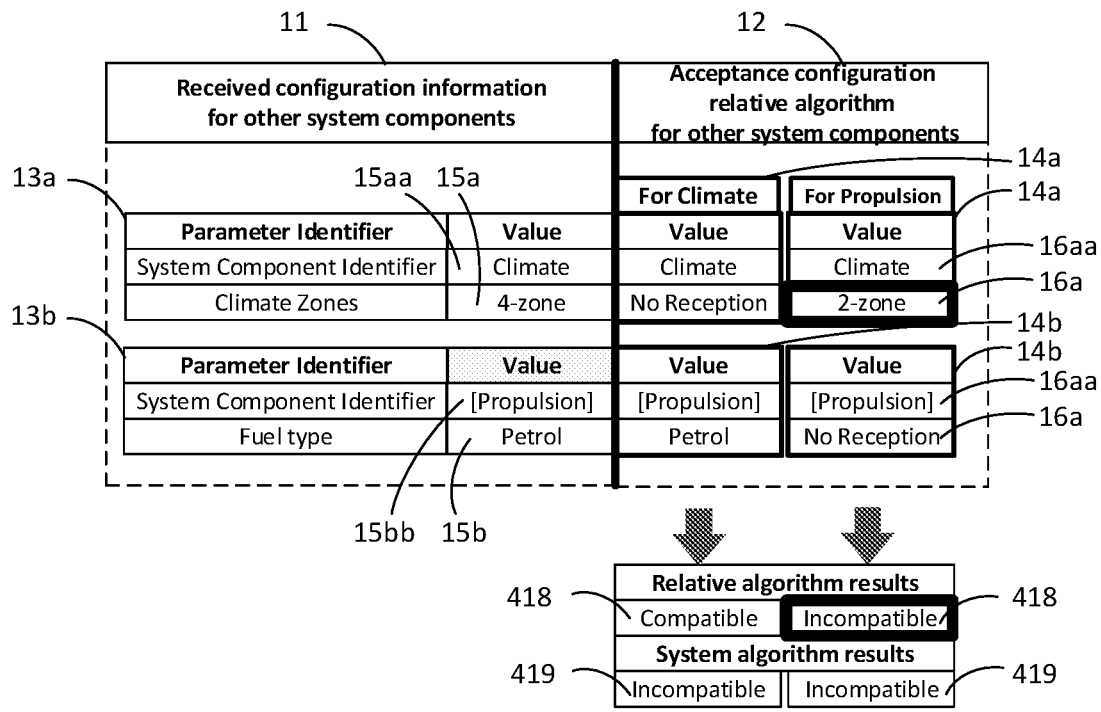
FIG. 33 is an illustration of algorithm structure of an incompatible configuration of the climate and propulsion system shown in FIG. 31.

Let's look at an example of an in-vehicle system involving two system components a climate system and a propulsion system. Each of those two systems do not need the other system in order to perform its system function. The climate system do not directly need the propulsion system in order to deliver climate functionality such as humidity, ventilation, or air conditioning. The propulsion system do not at all need the climate system in order to propel the vehicle. Both systems come in variants, but there is a non-functional dependency between climate system and propulsion system. The climate system come in two variants, a 2-zone variant with low electrical energy consumption, and a 4-zone variant with much higher electrical current consumption. The climate system have a parameter identifier 'Zones Type' with parameter values which can be '2-zone' or '4-zone'. The propulsion system also have two variants, a variant with Diesel engine and a variant with petrol engine. The engine control module have a parameter identifier 'Fuel Type' with parameter values which can be 'Diesel' or 'Petrol'. The climate system is powered from the vehicle electrical system battery. The battery is charged by an alternator driven by the combustion engine in the propulsion system. The propulsion system therefore have a dependency to the climate system. In FIG. 31 the three compatible system combinations of climate system and propulsion system are shown with dashed lines. More combinations than shown in FIG. 31 of these system components can be made, and all those combinations are incompatible. A vehicle consisting of two different climate systems from FIG. 31 is incompatible as well as a vehicle with only a climate system and no propulsion system, or a system of perhaps two propulsion systems with different fuel. In this example the 4-zone climate system consume so much electrical power that it severely increase the emission levels of the petrol combustion engine. Assume this example petrol engine have certain characteristics like weak power output capability that requires it to use significantly more fuel to produce more power to also drive the alternator, in addition to propelling the vehicle. The extra fuel needs to provide more mechanical power and hence more electrical power to charge the battery. In order to successfully certify the vehicle according to emission legislation in certain markets, the vehicle must not be built with the combination of a 4-zone climate system and petrol engine. The emission of petrol engine with a 4-zone climate system exceed legislated emission levels. Hence there exists an incompatible combination of system components that needs to be avoided. In this example in FIG. 31, a compatible system means that there exist a climate system and a propulsion system which result in that the vehicle do not exceed emission legislation levels, a non-functional dependency. In FIG. 32 it is shown in a combined view for one of the compatible configurations; the 2-zone climate system and the diesel propulsion system. It is shown the systems configuration with parameter identifiers and parameter values of relative algorithm and system algorithm results for both climate and propulsion system. Numerals refer to the same numerals in FIG. 4 and FIG. 10. In FIG. 33 it is shown in a combined view for the incompatible configuration of the 4-zone climate system and the petrol propulsion system. It is shown the systems configuration with parameter identifiers and parameter values of relative algorithm and system algorithm results for both climate and propulsion system. Numerals refer to the same numerals in FIG. 4 and FIG. 10, which are explained below.

Although the propulsion system and climate system each constitute a respective system component in the example above, the designer may choose the scope of each system component; i.e. e.g. the propulsion system and/or climate system may be divided in to a plurality of system components e.g. comprising between 10 to 100, or between 5 to 500 system components each.

Let's look at another example of an in-vehicle system involving a rear viewing camera system, implemented in two system components, a camera hardware (creating the image) and a software which do image processing and detect objects in the image. The purpose of the object detection may be for a safety system, e.g. detect people in the image and alert driver about the people, or simply intervene with vehicle propulsion system to prevent the vehicle from reversing into people. This system come in variants, and all valid variants must consist of one camera and one image processing software. Typical camera system specific attributes could be e.g. image size (horizontal pixels, vertical pixels), image aspect ratio, image orientation (landscape, portrait) or image refresh frequency (frames per second). To simplify let's discuss an example using only the image size as parameter influencing compatibility. According to this example there are two variants of the camera producing the image, one variant which is producing images with 320×240 pixels, and another variant creates images with 1080×720 pixels, the entities denoted Camera in the FIG. 34. Both cameras transmit the image data on a TCP/IP communication link to the processing software and the transmission only include raw pixel data. The camera have a parameter identifier 'Camera Image Size' with parameter values which can be '320×240' or '1080×720'. Moreover, there are three variants of the software processing the image, one that can only process images with 320×240 pixels, and another variant that can only process images with 1080×720 pixels and one that can process any image size, the entities denoted Processing in FIG. 34. The processing software have a parameter identifier 'Processing Image Size' with parameter values which can be '320×240', '1080×720' or 'Any Size'.

Figure 34:
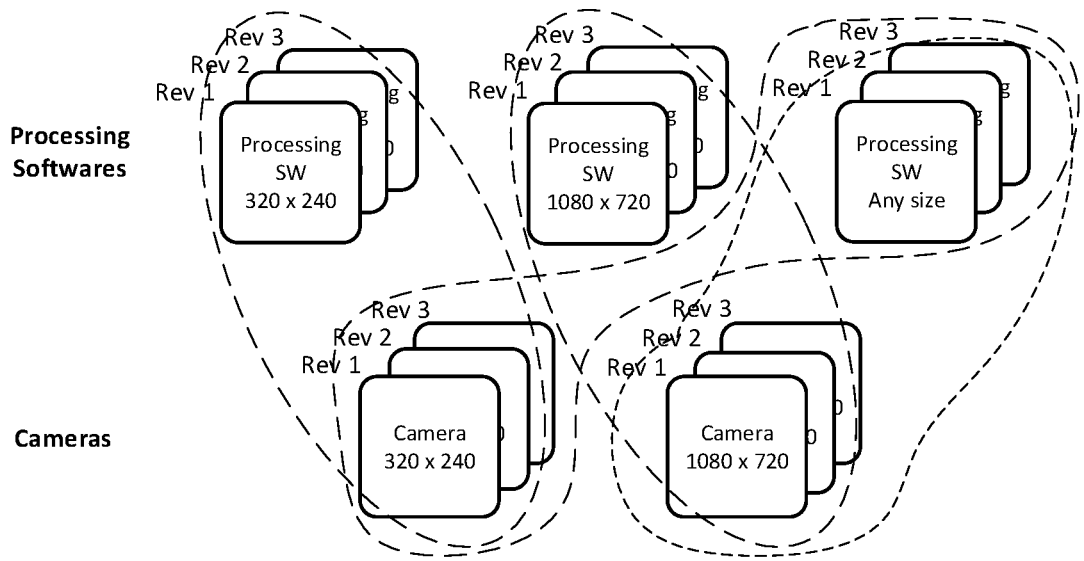
FIG. 34 is an illustration of compatible and incompatible system combinations of camera and processing software.
Figure 35:
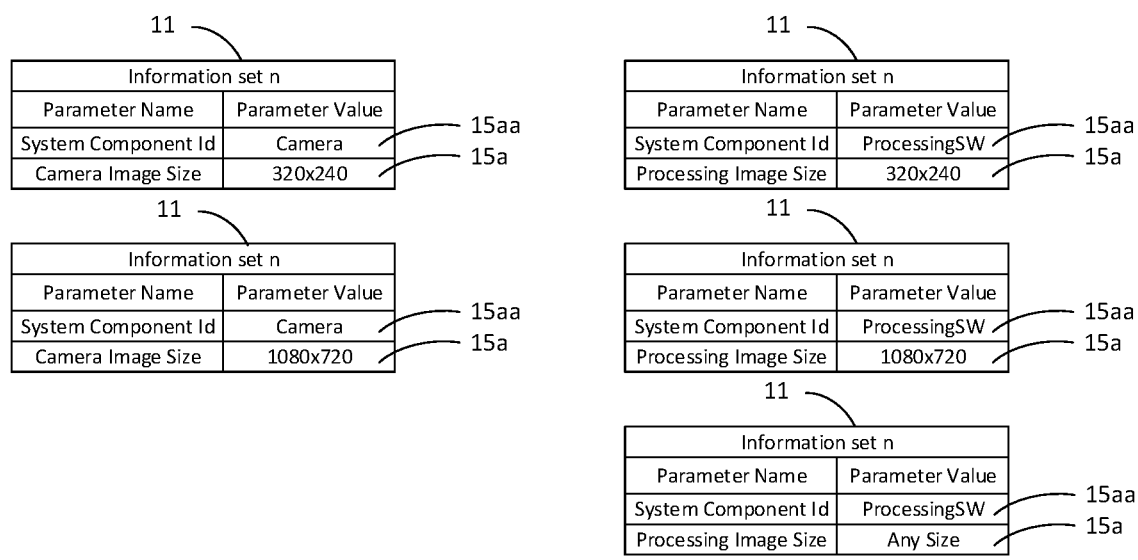
FIG. 35 is an illustration of part of the configuration for the relative algorithms for the system shown in FIG. 34.

The reason for this system design and variants can be differentiating system performance level depending on image resolution vs. expected object detection quality, availability of components, cost, complexity, processing speed, current consumption etc. Other reasons for the three processing software may be that this is how the available machine vision technology have evolved over the vehicle platform life cycle. In FIG. 34 the compatible system component combinations of cameras and processing software are shown with dashed lines, there are only four compatible configurations. In this example in FIG. 34, a compatible system means that one camera is connected to one processing software, the camera produces images that the processing software can process and detect objects from, a functional dependency. More combinations than shown in FIG. 34 of these system components can be made, and all those combinations are incompatible. A system consisting of three, four or five system components from FIG. 34 is incompatible as well as a system of only a processing software, or a system of perhaps two different cameras. In FIG. 35 a part of the configuration of system identifiers and parameter values for relative algorithms for the two variants of camera and three variants of processing software is shown. Numerals refer to the same numerals in FIG. 4. For a human looking at the figures and knowing the intended compatible configurations described above this is obvious, but not so for a computer system having to determine whether a compatible configuration exist, and this may be resolved by putting suitable restraints on the compatibility by use of suitable parameters and parameter values, as explained on a general level in relation to e.g. FIG. 23 where the parameter value "No Reception" is used. Furthermore and according to one example, there exists at least three different releases of each of the 5 system components in FIG. 34, and the compatible pairs of these system components may be identified e.g. by use of the parameter value "No Reception" and running some or all of the system component in the algorithm described in relation to FIG. 21. Two releases of the same system component is obviously incompatible, and this may be indicated by use of the parameter value "No Reception", while any of the releases of e.g. Processing SW 320×240 may be compatible with any of the releases of e.g. Camera 320×240. According to another example, only release 1 and 2 of Processing SW 320×240 is compatible with release 1 of Camera 320×240; also this may be indicated with use of e.g. the parameter value "No Reception".

Figure 36:
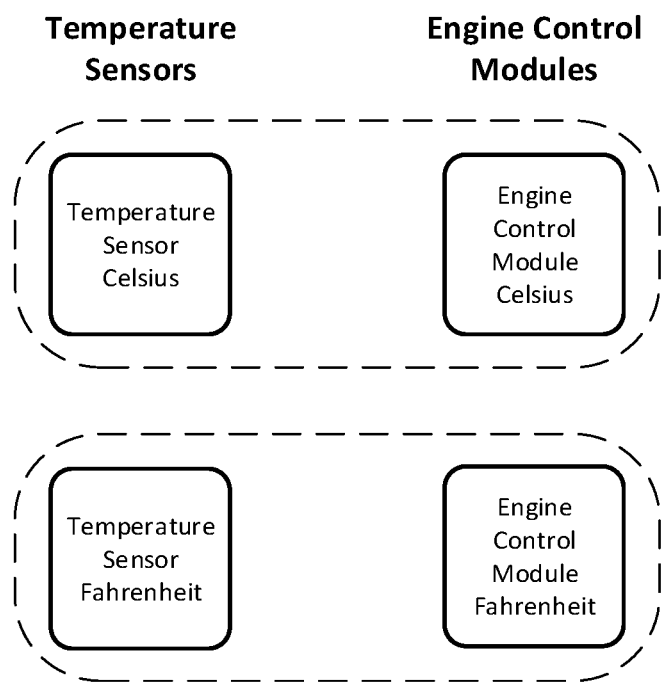
FIG. 36 is an illustration of compatible and incompatible system combinations of temperature sensors and engine control modules.
Figure 37:
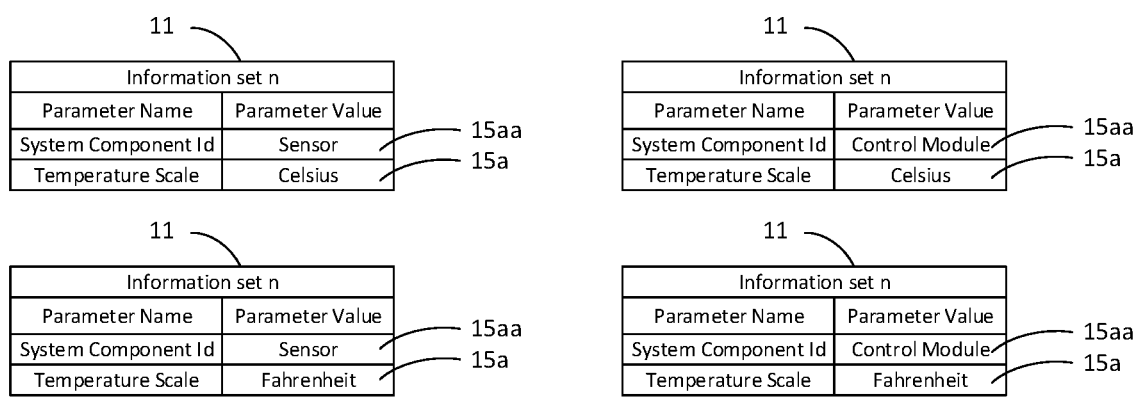
FIG. 37 is an illustration of part of the configuration for the relative algorithms for the system shown in FIG. 36.

Let's look at another example of an engine coolant temperature sensor and engine control module. The engine control module uses the temperature information to, among other things, control the amount of fuel injected into an internal combustion engine in order to properly operate the combustion process in various temperature conditions. The temperature sensor come in two variants, a Celsius based variant, and a Fahrenheit based variant. The sensor have a parameter identifier 'Sensor Temperature Scale' with parameter values which can be 'Celsius' or 'Fahrenheit'. Both temperature sensor variants produce a temperature output which is represented by 9 bits. The output is an integer two-complement value ranging from −256 up to +255 that is communicated to engine control module. None of the temperature sensor communicate to the engine control module which variant they are, but simply produce a temperature value. The engine control module also come in two variants, a Celsius based variant, and a Fahrenheit variant. The engine control module have a parameter identifier 'Module Temperature Scale' with parameter values which can be 'Celsius' or 'Fahrenheit'. The Celsius variant engine control module only operate properly if it is connected to a Celsius based temperature sensor. Similarly the Fahrenheit variant engine control module only operate properly if it is connected to a Fahrenheit based temperature sensor. In FIG. 36 the two compatible system combinations of temperature sensor and engine control module are shown with dashed lines. More combinations than shown in FIG. 36 of these four system components can be made, and all of those combinations are incompatible. If the actual engine coolant temperature is 0 degrees Celsius, then the Celsius based temperature sensor will produce '0' and the Fahrenheit based temperature sensor will produce '+32' since 0 degrees Celsius correspond to +32 degrees Fahrenheit. If the Fahrenheit based temperature sensor is connected to a Celsius based engine control module, the engine control module will assume the temperature is +32 degrees Celsius, when it is actually 0 degrees Celsius. This will make the engine control module assume it is +32 degrees Celsius and will significantly contribute to an incorrect control of the combustion process, which may negatively affect drivability and emissions of the engine. The engine control modules cannot determine which temperature sensor variant it is connected to, not even by analyzing the temperature values from the temperature sensor, since it produce a 9 bit value of +32 degrees Fahrenheit and +32 is a valid temperature on the Fahrenheit scale and also a plausible engine coolant temperature. In this case both the temperature sensor and the engine control module operate as designed but the result on propulsion system level is not a valid system. Hence there exists an incompatible combination of system components that needs to be avoided. In FIG. 37 a part of the configuration of system identifiers and parameter values for relative algorithms for the two variants of camera and three variants of processing software is shown. Numerals refer to the same numerals in FIG. 4. In this example in FIG. 37, a compatible system means that a temperature sensor and an engine control module is based on the same temperature system, either Celsius or Fahrenheit, an interface dependency.

An automotive system may be divided between inside and outside of a vehicle and dynamically changing where system capabilities (i.e. configurations) can be changing in runtime. A system component capability could change during system running, or between time domains of system running, and the system configuration data could change to dynamically. For instance, at least one system component may not be part of the vehicle, but part of something else, or the system can consist of system components from more than one vehicle, acting as a system.

The invention is scalable and uses up to three algorithms to achieve compatibility evaluation in system components.

A root compatibility algorithm may be used in each system component to determine its compatibility in relation to a system master reference configuration. The result from this algorithm tells whether the root cause of system incompatibility is within the own system component or not. This algorithm is used if there is a need to positively identify which system component is incompatible.

A relative compatibility algorithm is used in each system component to determine its own perception of compatibility/incompatibility with the rest of system. The result from this algorithm does not identify whether the absolute root cause of a local incompatibility is within the own system component or another system component. This algorithm is used if there is a need to identify if any system component is incompatible with rest of system.

A system compatibility algorithm is used in each system component to determine the complete system perception of compatibility/incompatibility. This algorithm is used if there is a need for one or more system components to be aware whether the complete system is compatible or incompatible.

According to one example, the root compatibility algorithm uses a system component local configuration information and compares it with a reference configuration information. There is one reference configuration information in the system and it is used in all system components in their respective root algorithms. The algorithm produces a result meaning compatible or incompatible system component.

Figure 1:
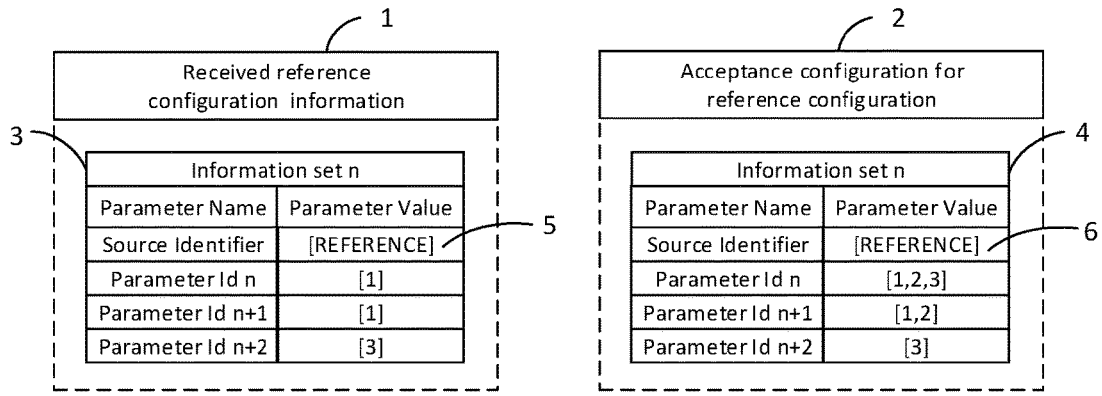
FIG. 1 is an illustration of inputs to a root algorithm according to an embodiment of the invention.

FIG. 1 shows the inputs to the root compatibility algorithm. There is one reference configuration information 1 and one corresponding locally stored configuration information 2. The algorithm compares the reference configuration information 1 and the locally stored configuration information 2.

To know that it is the reference configuration for this system, information 1 and the locally stored configuration information 2 that shall be compared, an identifier in the form of a source identifier 5, 6 is looked up within the information sets 3, 4 of the reference configuration information 1 and the locally stored configuration information 2, respectively. If the value of the source identifier 5 is identical to the value of the source identifier 6, then it is known that information set 3 shall be compared with information set 4.

Figure 2:
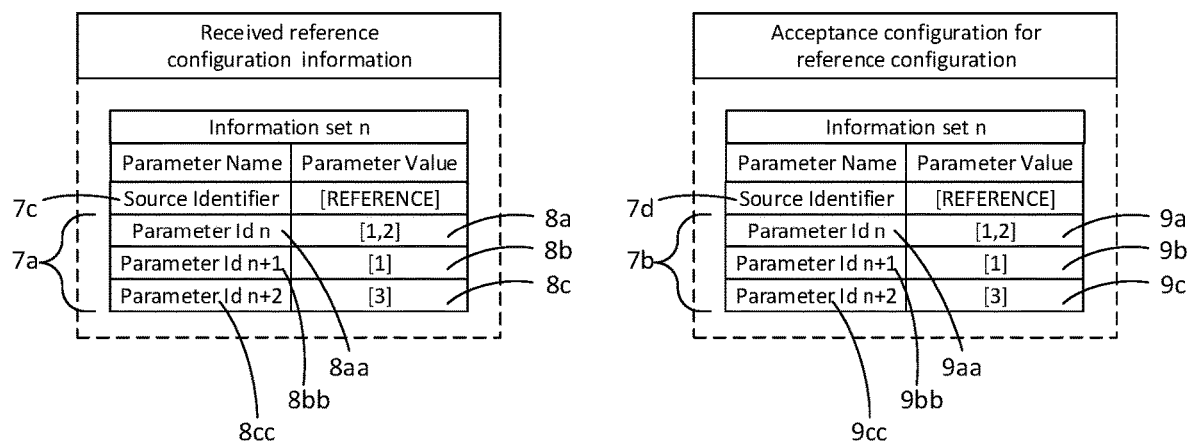
FIG. 2 is an illustration of a root algorithm structure of the embodiment in FIG. 1.

Referring to FIG. 2, when it is known which of the information sets 3 and 4 shall be compared, then each of the parameters in the list of set of parameters values 7a shall be compared with the corresponding parameters in the list of sets of parameter values 7b. The number of parameters in the list of sets of parameter values 7a and the list of sets of parameter values 7b, can be any number ranging from 1 to many parameters. Each parameter in the list of sets of parameter values 7a and the list of sets of parameter values 7b can be a list of parameter values, ranging from 1 to many parameter values. According to this example the parameters are Parameter Id n; Parameter Id n+1, Parameter Id n+2; and the parameter values are [1,2], [1], [3]; [1,2,W], [1,2], [3]. Said parameter value 8a, 8b, 8c, 9a, 9b, 9c can be a plurality of arbitrary values such as [1,3,W] and/or a range of parameter values, a parameter value range, e.g. covering a specified interval of values e.g. all even values in the interval. Additionally or alternatively, a parameter value range can be based on a start value and an end value and the parameter value range then means each and every value from the start value to the end value. Each parameter value 8a, 8b, 8c in the list of sets of parameters 7a is individually compared with the corresponding parameter value 9a, 9b, 9c in the list of sets of parameter 7b, e.g. parameter value 8a is compared with parameter value 9a, and parameter value 8b is compared with parameter value 9b and so on. If one or more of the values of parameter values 8a are identical to one or more values in parameters values 9a then it means this parameter is compatible, otherwise it is incompatible. According to one example, if one or more of the values in parameter value 8a are identical to at least one value in parameters value 9a then it means this parameter is compatible, otherwise it is incompatible. According to another example one or more of said parameter values 9a, 9b, 9c is a threshold value, then all values are up to a certain value are considered compatible, and any value above this threshold is considered incompatible. Alternatively it can be all values equal to or above that is considered compatible, and values below that is considered incompatible. Additionally or alternatively, if a value in parameter value 8a cannot be found in parameter value 9a then this parameter is incompatible.

The number of parameters in the list of sets of parameter values 7a and the list of sets of parameter values 7b, can be any number ranging from 1 to many parameters. Each parameter 8aa, 8bb, 8cc; 9aa, 9bb, 9cc; in the list of sets of parameter values 7a and the list of sets of parameter values 7b can be a list of parameter values, ranging from 1 to many parameter values. Each parameter value 8a, 8b, 8c in the list of sets of parameter 7a is individually compared with the corresponding parameter value 9a, 9b, 9c in the list of sets of parameter 7b, e.g. parameter value 8a is compared with parameter value 9a, and parameter value 8b is compared with parameter value 9b and so on. If one or more of the parameters or values in parameter value 8a are identical to one or more parameters or values in parameter value 9a, then it means that this parameter 8aa is compatible, otherwise it is incompatible.

Figure 3:
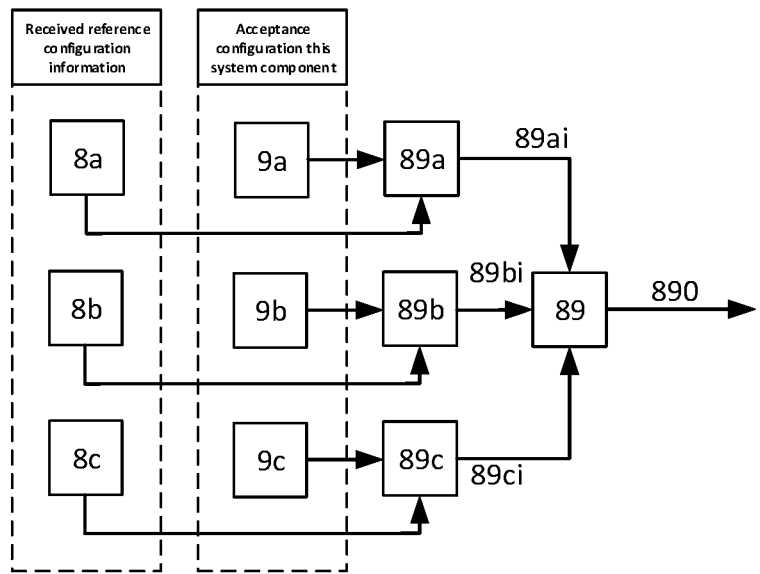
FIG. 3 is another illustration of a root algorithm structure of the embodiment in FIG. 1.

FIG. 3 shows that from each comparison 89a, 89b, 89c of parameters 8a+9a, 8b+9b, 8c+9c there is an intermediate result 89ai, 89bi, 89ci, compatible or incompatible for the comparison information set 3 vs information set 4. If all those intermediate results 89ai, 89bi, 89ci, evaluated in comparison 89, are compatible then there is a final algorithm result 890 meaning compatible, otherwise the final algorithm result is incompatible. The final result 890 relates to the local compatibility of this system component in relation to the master reference configuration.

The relative compatibility algorithm uses system component local configuration information from all system components and compare it with local configuration information. The algorithm produces a result meaning compatible or incompatible system component.

There may also be a possibility to perform a validation on a subset of configuration points, where only the configuration points relating to certain aspect domains, such as for instance interface related, mechatronic or functional. The comparison 89 may then only use the intermediate results from the comparisons 89a, 89b, 89c relating to the relevant aspect domains. Alternatively, there may be a defined validation order with regards to the aspect domains, that is an order in which the comparisons 89a, 89b, 89c are to run.

Figure 4:
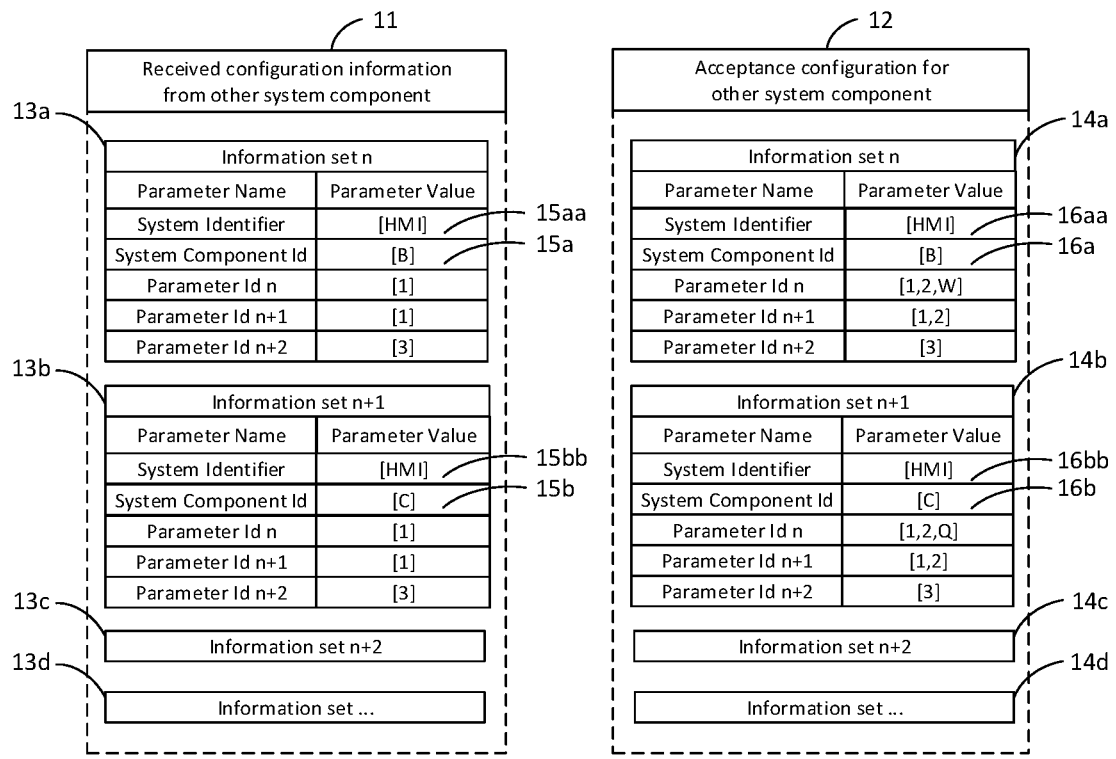
FIG. 4 is an illustration of inputs to a relative algorithm according to another embodiment of the invention.

FIG. 4 shows the inputs to the relative compatibility algorithm. For each system component other than the system component itself there is received configuration information 11 and corresponding locally stored configuration information 12. All received configuration information sets 13a, 13b, 13c, 13d and so on, from each other system component, shall be compared to one corresponding configuration information sets 14a, 14b, 14c, 14d and so on. The number of pairs of information sets that can formed by information sets 13a, 13b, 13c, 13d and information sets 14a, 14b, 14c, 14d can be any number ranging from 1 to many. Therefore, at minimum information set 13a and information set 14a to form one information set pair.

If a system identifier is used, then system identifier and system component identifier, are looked up within information sets 13a, 13b, 13c, 13d to find the information set where system identifier and system component identifier in information sets 13a, 13b, 13c, 13d is identical to system identifier and system component identifier in information sets 14a, 14b, 14, 14d. If the value of system identifier 15aa and value of system identifier 16aa are identical, and value of system component identifier 15a and system component identifier 16a are identical, then it is known that information set 13a shall be compared with information set 14a. Further information sets 13b, 13c, 13d, 14b, 14c, 14d are looked up according to the same procedure.

If a system identifier is not used, then system component identifier are looked up within information sets 13a, 13b, 13c, 13d to find the information set where system component identifier in information sets 13a, 13b, 13c, 13d is identical to system component identifier in information sets 14a, 14b, 14, 14d. If the value of system component identifier 15a and system component identifier 16a are identical, then it is known that information set 13a shall be compared with information set 14a. Further information sets 13b, 13c, 13d, 14b, 14c, 14d are looked up according to the same procedure.

Figure 5:
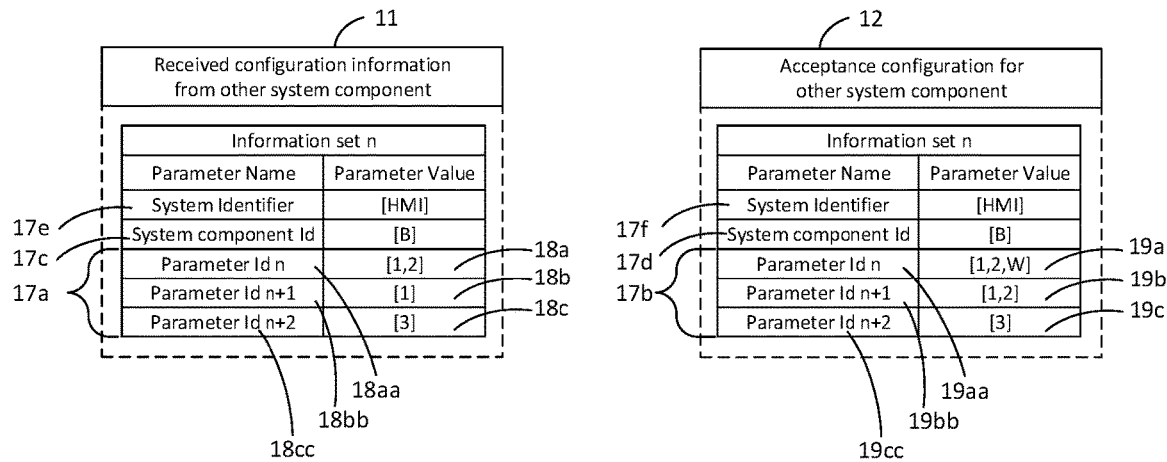
FIG. 5 is an illustration of a relative algorithm structure of the embodiment in FIG. 4.

Referring to FIG. 5, when it is known which of information sets 13a, 13b, 13c, 13d to compare with which one of information sets 14a, 14b, 14c, 14d then each parameter value 18a, 18b, 18c in a list of sets of parameters and parameter values 17a shall be compared with the corresponding parameter value 19a, 19b, 19c in a list of sets of parameters and parameter values 17b. The parameters 18aa, 18bb, 18cc; 19aa, 19bb, 19cc and the parameter values 18a, 18b, 18c; 19a, 19b, 19c may be configured or set up as explained in relation to FIG. 2. Each parameter or value in the parameter value list in 18a, 18b, 18c in the list of sets of parameter 17a is individually compared with the corresponding parameter or value in the parameter value list 19a, 19b, 19c in the list of sets of parameter 17b, e.g. parameter value 18a is compared with parameter value 19a, and parameter value 18b is compared with parameter value 19b and so on.

If one or more of the parameter or values in parameter value 18a are identical to one or more of the parameters or values in parameter value 19a then this parameter 18aa is compatible. The comparation may be performed as explained in relation to FIG. 2 and return the same compatibility result.

If a system identifier from either information 11 or information 12 cannot be found in the other information 12 or information 11, then this information set is ignored and can not influence the result of the relative algorithm. This mean that such the received configuration information does not belong to this system. If system identifier 15aa is identical to system identifier 15bb, and if a system component identifier from either information 11 or information 12 cannot be found in the other information 12 or information 11, then the final result 189i of the relative algorithm is incompatible regardless of what intermediate results 189ai, 189bi, 189ci in the relative algorithm. Similar applies to the final result 999 in FIG. 7. This would mean that either there are too many, too few or unexpected system components in this system, an incompatible group of system components.

If an acceptance configuration 19a is set to 'N/A' (not applicable) this means that the comparison result for any 18a is always compatible, regardless if 18a is received or 18a is not received. It is similar for 19b and 19c. If an acceptance configuration 19a is set to 'No Reception' this means that if 18a is received, then the result for that comparison is incompatible, regardless of the value of 18a. The procedure is similar for 19b and 19c.

Figure 6:
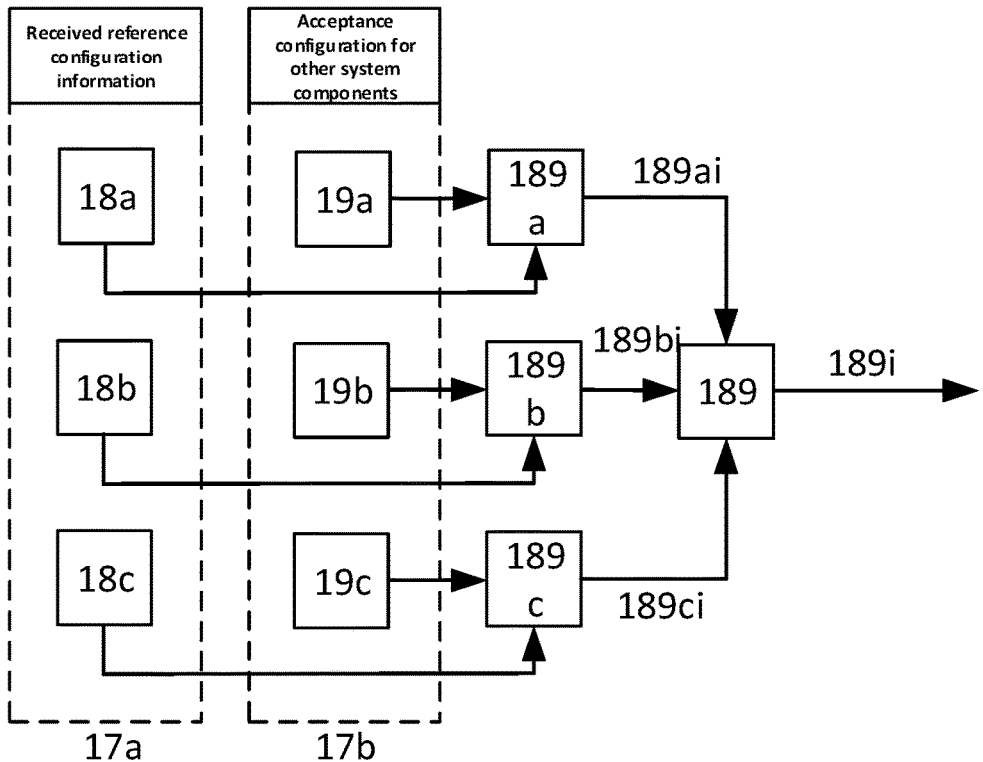
FIG. 6 is another illustration of a relative algorithm structure of the embodiment in FIG. 4.

FIG. 6 shows that from each comparison 189a, 189b, 189c of parameters 18a+19a, 18b+19b, 18c+19c there is an intermediate result 189ai, 189bi, 189ci, compatible or incompatible for parameter 18a vs parameter 19a, parameter 18b vs parameter 19b, parameter 18c vs parameter 19c. If all system component identifiers in 11 are found in 12, and if all intermediate results 189ai, 189bi, 189ci are compatible then there is a further intermediate result 189i, determined in comparison 189, this system component being compatible to one other system component, if at least one of the intermediate results 189ai, 189bi, 189ci are incompatible, then the intermediate result 189i result is incompatible, this system component is incompatible to one other system component.

Figure 7:
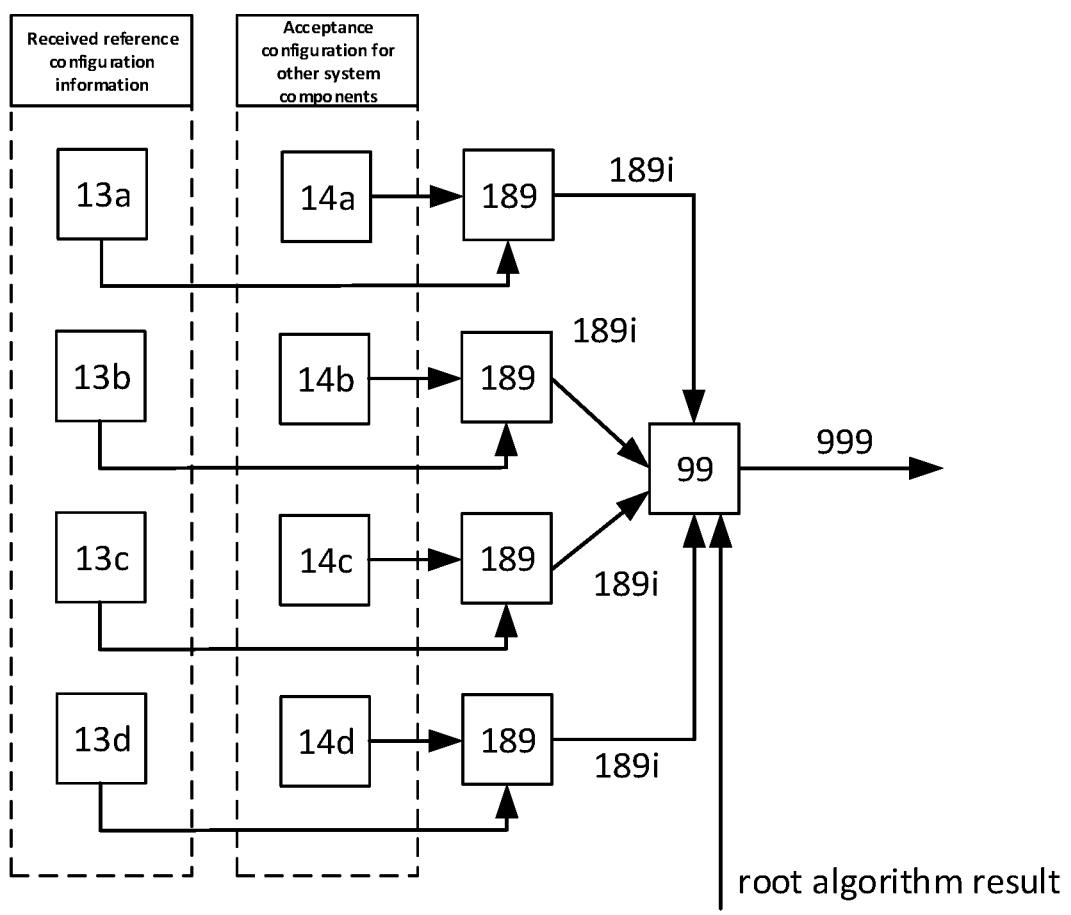
FIG. 7 is yet another illustration of a relative algorithm structure of the embodiment in FIG. 4.

FIG. 7 shows that from each comparison of information sets 13a+14a, 13b+14b, 13c+14c (each one made as shown in FIG. 6) there is an intermediate result 189i. If all those intermediate results 189i are compatible, as evaluated in comparison 99, then there is a final algorithm result 999 meaning compatible, otherwise the final result is incompatible. The final result 999 relate to the relative compatibility of this system component versus all other system components.

If the root algorithm is used, then all intermediate result 189i and the root algorithm result have to be compatible in order for the relative algorithm final result 999 to be compatible, otherwise the relative algorithm final result is incompatible.

The system compatibility algorithm uses the results, compatible or incompatible from all system components relative compatibility algorithms including the relative algorithm in this system component. If a root algorithm is present in the system component, the result from that algorithm is used as input to system algorithm in addition to relative algorithm results. If all those final results are compatible, then the system algorithm result is compatible. If at least one input result to system algorithm is incompatible, then the system algorithm result is incompatible. The final result relates to the compatibility of the complete system of system components.

For all algorithms, root-, relative- and system algorithm, when configuration information is communicated sequentially between system components, there is a need to uniquely identify the system identifier, parameter identifiers and the parameter values. This can be done based on a predetermined order of communicating the system identifiers, system identifier value, parameter identifiers and parameter values, where the system identifier and parameter identifier are not communicated but only their values are communicated, therefore reducing needed communication bandwidth.

Alternatively, if it is undesired to have a predetermined order, then each parameter identifier and its parameter value is communicated in a pair, similar for the system component identifier and the system identifier value. Therefore the parameter identifier/value pairs and system component identifier/value can be communicated in any order. In root algorithm, relative algorithm and system algorithm, the parameter values communicated between and used in those algorithms may be symbolic, or represented by other values when communicating parameter values between algorithms and evaluating the compatibility/incompatibility within algorithms. I.e. if a parameter value has the logical meaning of 'low Performance' it may be represented by e.g. a numeric value 1 or a character and 'Hi Performance' may be represented by e.g. a numeric value 2 or a character 'H'. A output result of an algorithm may be 'Compatible' or Incompatible, and may be represented by numerical values, for example 1 or 0. Therefore the actual value communicated and used in the algorithms may be other than the logical meaning. Other representation may be binary values, textual value, discrete voltage levels or other types of representation. Additionally or alternatively, e.g. the parameter identifier/value pairs and/or system component identifier/value may also be represented by a representation other than its logical meaning, such as one or more numerical values, binary values, textual value, discrete voltage levels, as explained for the parameter value above.

The evaluation of system component compatibility can be made in several ways in the vehicle. See the following sections for alternative structuring. System components can be located in the same module HW or they can be located in separate module HWs. From here on system component and module means the same thing, decision module is an example of a system master, and the terms variant information and configuration information are used interchangeably.

Figure 8:
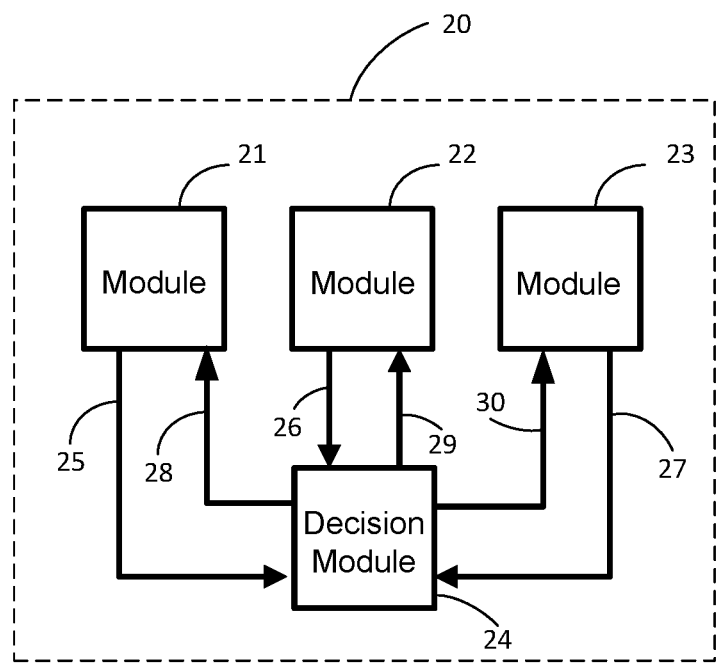
FIG. 8 is an illustration of a centralized evaluation of system compatibility according to an embodiment of the invention.

In a centralized system compatibility detection, one of all modules make decision on whether other modules are compatible with it and each other, based on that other modules transmit its variant domains information. For variant domain the modules can transmit one or more variants. For each variant domain the master can accept one or more variants as being compatible. The master module will allow or not allow modules to execute their user functions depending on whether each module is compatible or not with the other modules. In FIG. 8 an automotive system 20 is comprised of modules 21, 22, 23. Each module 21, 22, 23 send its variant information 25, 26, 27 to a decision module 24. The decision module might be a system master. Each variant information 25, 26, 27 can contain one or more variant parameters describing the variant. Module 24 compare variant information 25, 26, 27 from module 21, 22, 23 and compare to variant information stored in module 24. If the compatibility detection result in module 24 means variant information 25, 26, 27 are not compatible then that result 28, 29, 30 is sent to each module 21, 22, 23. When each module 21, 22, 23 receive the result from module 24 then it will disable its user functional parts, the parts that are not compatible, and store that result until a new decision comes from module 24 telling it is compatible.

In a distributed system compatibility detection, all modules make local decisions of whether other modules are compatible with each module respectively, based on that other modules transmit its variant domains information. For each configuration domain the modules can transmit one or more variants. For each configuration domain the master can accept one or more variants as being compatible. Each module will allow or not allow itself to execute its functions depending on whether there is a compatibility or incompatibility between its own variant information and other modules variant information.

Figure 9:
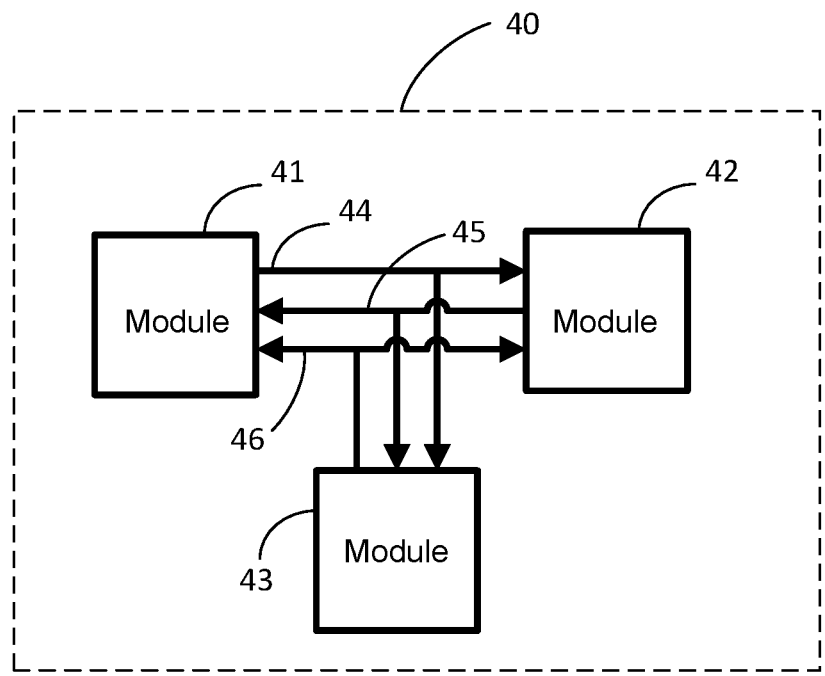
FIG. 9 is an illustration of a system with distributed evaluation of system compatibility according to an embodiment of the invention.

In FIG. 9 an automotive system 40 is comprised of modules 41, 42, 43. Each module 41, 42, 43 send its variant information to each other. Each variant information 41, 42, 43 can contain one or more variant parameters describing the variant. All modules 41, 42, 43 send variant information 44, 45, 46 to each other and compare its own variant information to the variant information received from other modules. If the compatibility detection result in 41, 42, 43 means are not compatible then a decision is made in each module respectively. If such decision is made each module 41, 42, 43 respectively will disable its user functional parts, the parts that are not compatible, and store that result until a new decision is made.

Figure 10:
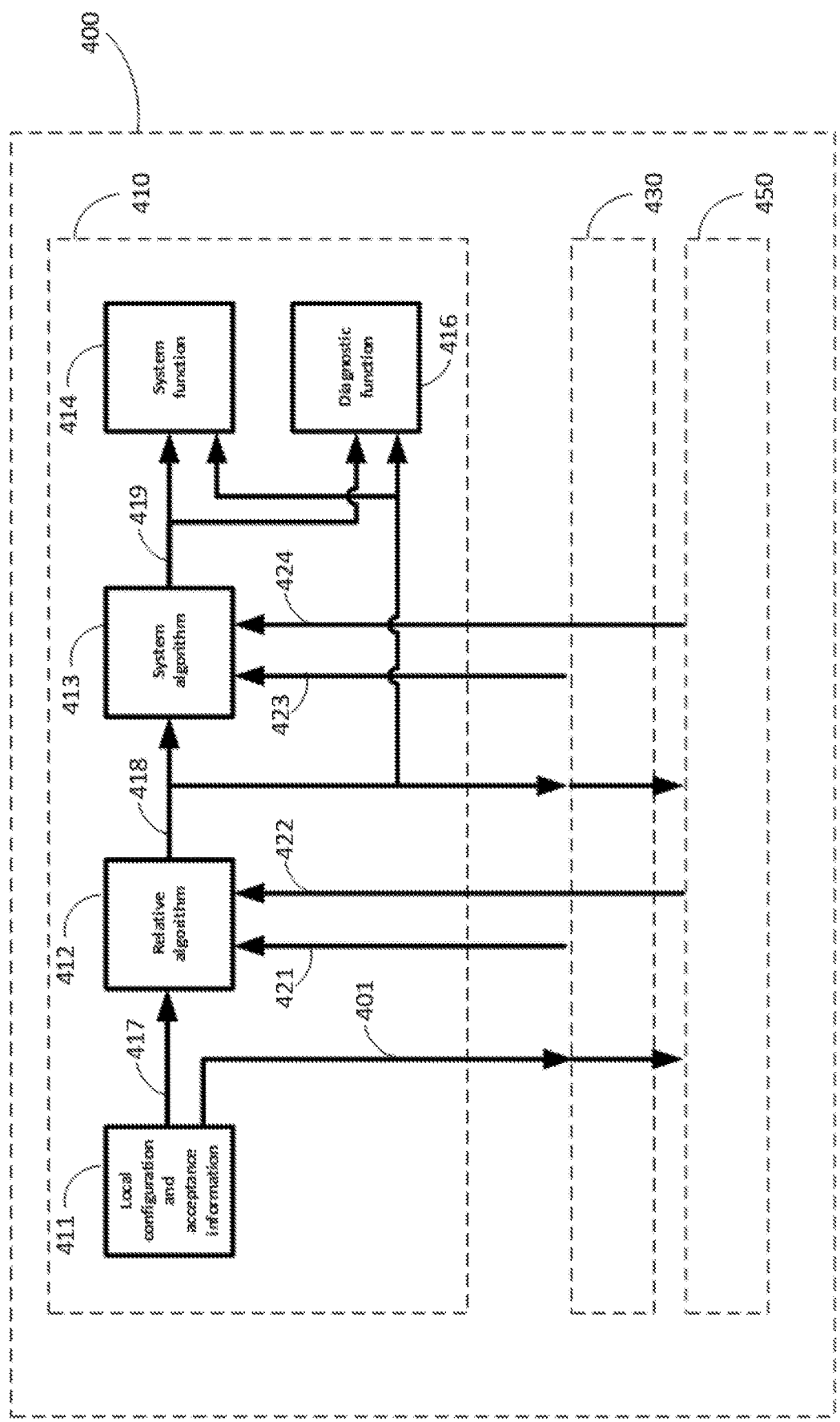
FIG. 10 is an illustration of a system with distributed evaluation of system compatibility with detailed view of system component structure.

In FIG. 10 an automotive system 400 is comprised of modules 410, 430, 450 and they correlate to modules 41, 42, 43 in FIG. 9. For simplicity only the internal function of module 410 is shown, and modules 430, 450 are internally identical to module 410. The local configuration information describing the own modules variant is stored in local configuration and acceptance information 411 and is communicated to the other modules by information 401. Receiving the other modules local configuration is represented by information 421, 422. The local configuration information describing what local configuration information the module accept as compatible (acceptance filter) from other modules is stored in local configuration and acceptance information 411 and is provided to the relative algorithm as information 417.

Relative compatibility decision: Each module 410, 430, 450 makes a local decision in algorithm 412. The relative algorithm result made in algorithm 412 concern whether the own modules 410 variant information is compatible with variant information 421, 422 received from the other modules. If the result of relative result 418 means the own module is not compatible with the other modules it will disable system functions in system function 414 and in case of incompatibility a diagnostic trouble code (DTC) is stored in diagnostic function 416. This relative algorithm result is communicated to the other modules by information 418. Receiving the other modules relative compatibility result is represented by information 423 and information 424.

System compatibility decision: Each module 410, 430 and 450 make a system algorithm result in 413. The system algorithm result made in system algorithm 413 concern whether the own module 410 relative compatibility result and the other modules 430, 450 compatibility results all mean they are all compatible. The results from relative algorithm result 418 and system algorithm result 419 can affect system function 414 to disable it if results are incompatible. The relative algorithm result 418 and system algorithm result 419 can be stored in diagnostic function 416.

Only the relative algorithm, or both relative and system algorithm can be implemented in each system components. If only the relative algorithm is used, then algorithm result 418 is used with system function 414 and diagnostic function 416. If both the relative algorithm and the system algorithm are used, then algorithm result 419 is used with system function 414 and diagnostic function 416.

Figure 11:
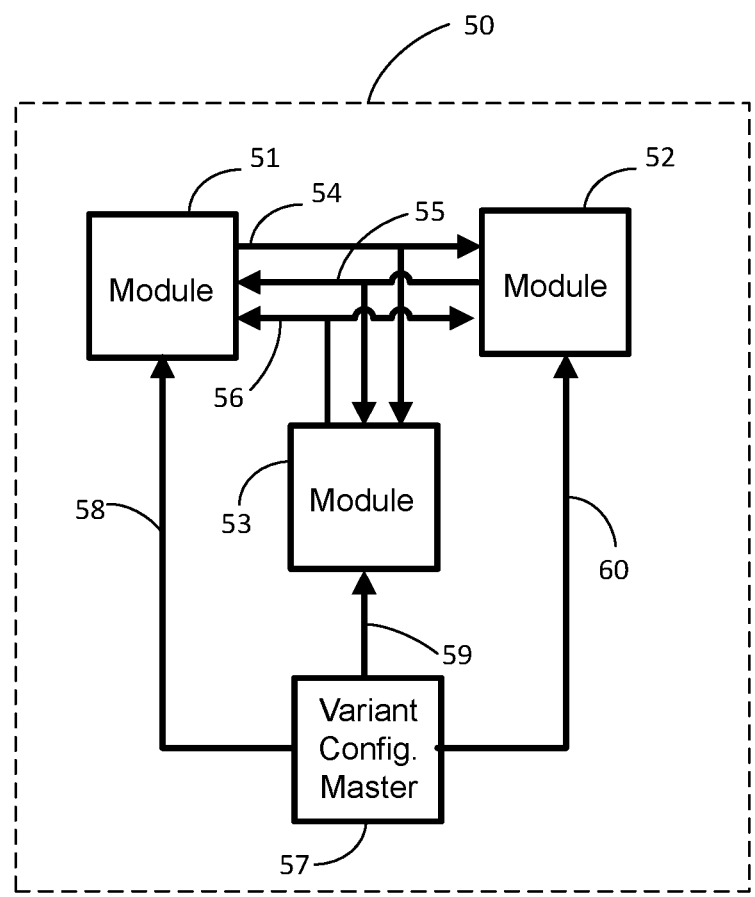
FIG. 11 is an illustration of a system with distributed evaluation of system compatibility, with configuration information.

In FIG. 11 an automotive system 50 is comprised of modules 51, 52 and 53 and a variant configuration master 57. Each module 51, 52, 53 send variant information 54, 55, 56 to each other. Each variant information 51, 52, 53 can contain one or more variant parameters describing the variant. The variant configuration master 57 compare its own variant information with the variant information received from other modules and with variant information 58, 59, 60 received from variant configuration master 57. In each module, if the comparison result in a decision which means configuration information 54, 55, 56 are not compatible then a decision is made in each module respectively. If such decision is made each module 51, 52, 53 respectively will disable its user functional parts and store that decision until a new decision is made.

Figure 12:
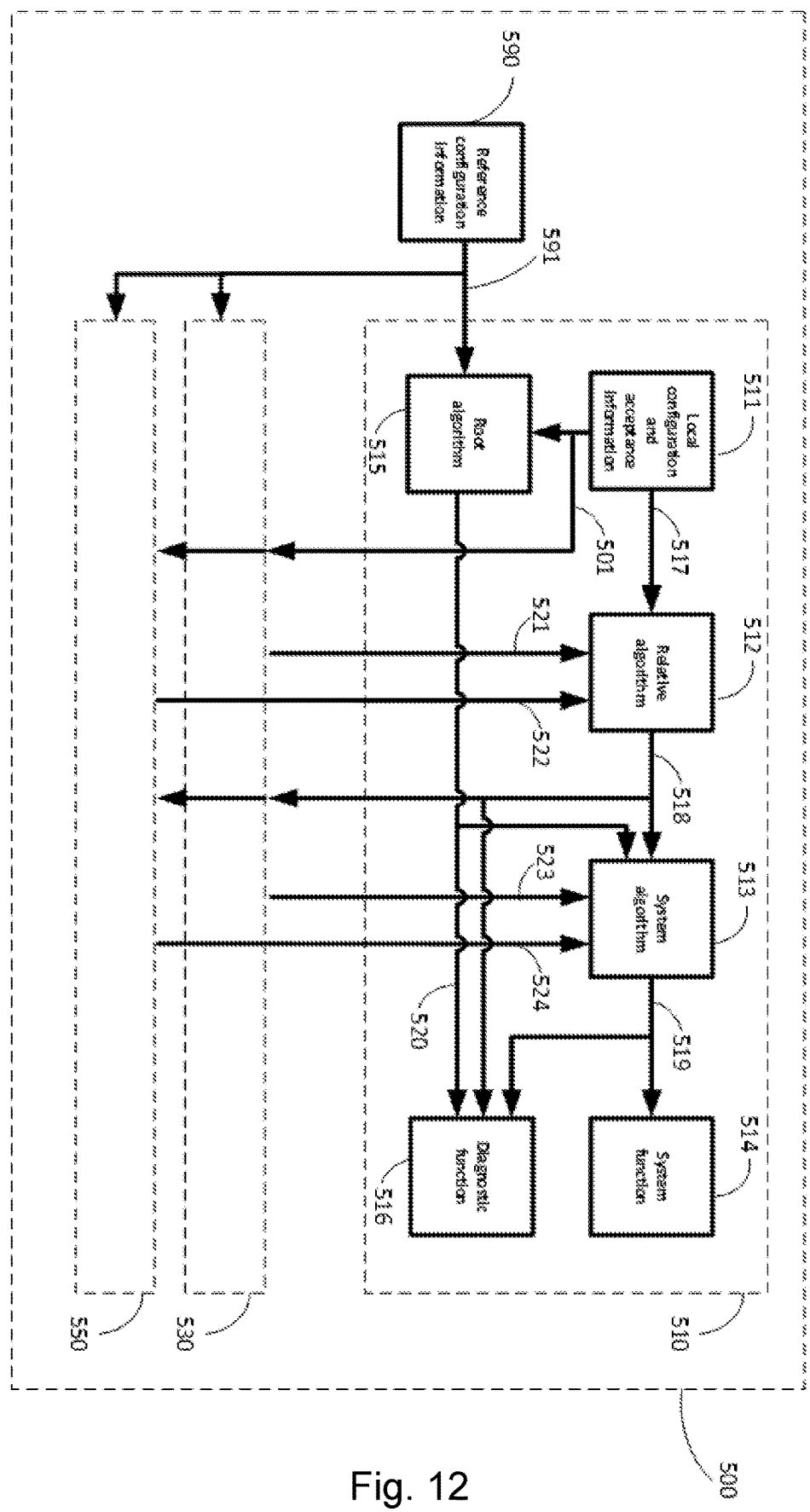
FIG. 12 is an illustration of a system with distributed evaluation of system compatibility, with configuration information, with detailed view of system component structure.

In FIG. 12 an automotive system 500 is comprised of modules 510, 530, 550 and they correlate to modules 51, 52, 53 in FIG. 11. For simplicity only the internal function of module 510 is shown, and modules 530 and 550 are internally identical to module 510. The local configuration information describing the own modules variant is stored in local configuration and acceptance information 511 and is communicated to the other modules by information 501. Receiving the other modules local configuration is represented by information 521 and information 522. The local configuration information describing what local configuration information the module accept as compatible (acceptance filter) from other modules is stored in local configuration and acceptance information 511 and is provided to the relative algorithm as information 517.

The local variant information is communicated to the other modules by information 501. In addition, a reference system configuration information is stored in configuration information 590 and communicated as information 591 to all modules 510, 520, 530. Each variant information can contain one or more variant parameters describing the variant.

Relative algorithm and system algorithm are used similar to FIG. 10. Algorithm 512 uses relative algorithm and algorithm 513 uses system algorithm. In addition algorithm 515 uses root algorithm.

In case the root algorithm result is incompatible, this system can determine which part of the system that has correct configuration and which parts has incorrect configuration as there is master reference information 591 available from configuration information 590. That decision is made in algorithm 515 where a comparison is made with information 591 which result in information 520, indicating whether the root cause of a system compatibility/incompatibility is in module 510 or not.

The root algorithm result 520 is forwarded to a diagnostic function 516. Systems 50 and 500 therefore has an advantage over systems 40 and 400 in which it cannot be identified the absolute root cause of incompatibility.

This relative algorithm result is communicated to the other modules by information 518. Receiving the other modules relative compatibility result is represented by information 523 and information 524. If both the relative algorithm and the system algorithm are used, then algorithm result 519 is used with system function 514 and diagnostic function 516.

Figure 13:
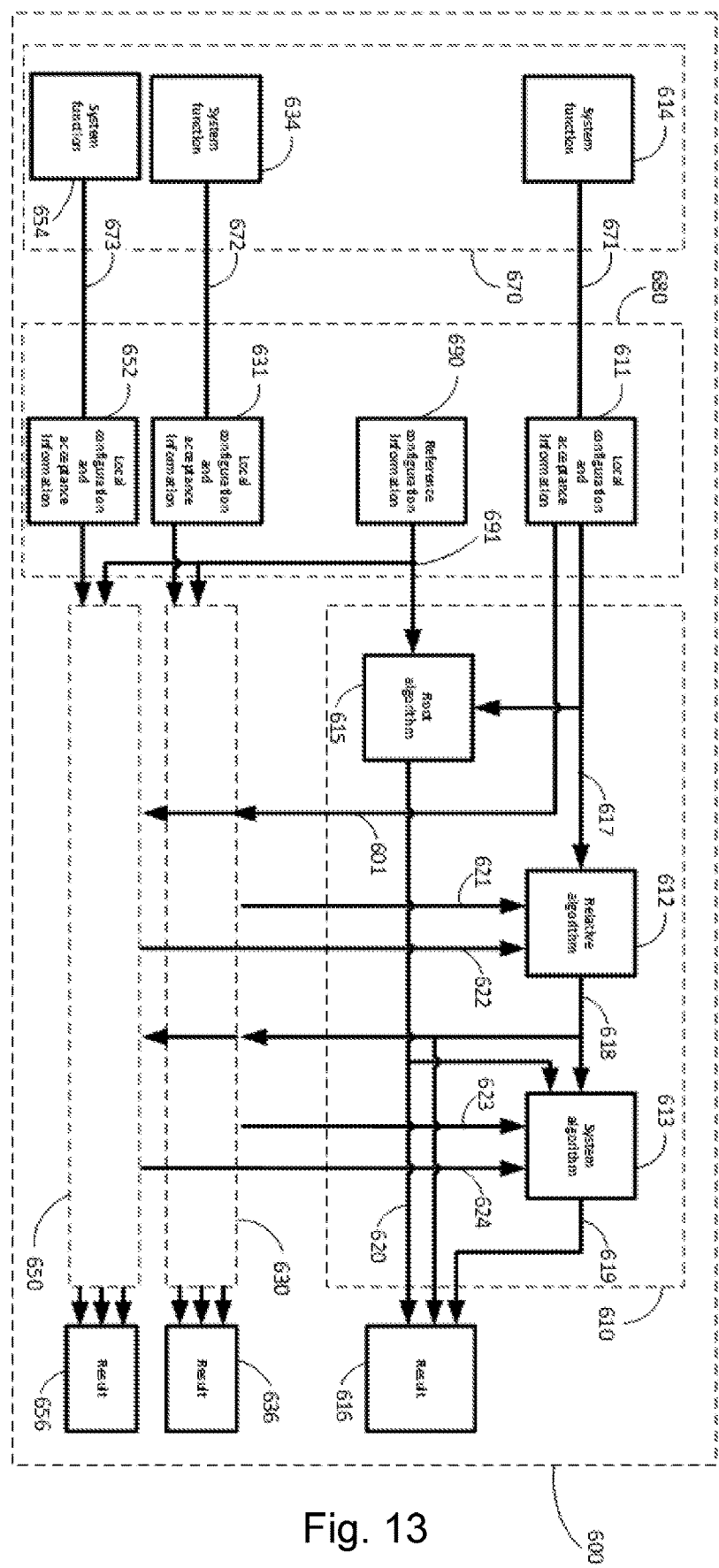
FIG. 13 is an illustration of a system with distributed evaluation of system compatibility, with configuration information, with detailed view of system component structure.

FIG. 13 shows that the configuration data can be placed outside each system component but still associated with the system components. System 670 is comprised of components 614, 634, 654. Configuration data 611, 631, 651 associated with those system components 614, 635, 655 are in configuration information 680 with associations 671, 672, 673 between system components and their configuration data. Compatibility output 618, 619, 620. The invention is then run in evaluation units 610, 630, 650, only on the configuration data in 611, 631, 651. All of system components 614, 634, 654 in system 670, configuration information 680, and evaluation units 610, 630, 650 can be in a vehicle, partly in-vehicle, or completely outside a vehicle.

The local configuration information describing the own system component variant is stored in local configuration and acceptance information 611 and is communicated to the other evaluation units by information 601. Receiving the other system components configuration information is represented by information 621 and information 622. The local configuration information describing what local configuration information the evaluation units accept as compatible (acceptance filter) from other evaluation units is stored in local configuration and acceptance information 611 and is provided to the relative algorithm as information 617.

The local variant information is communicated to the other evaluation units by information 601. In a further embodiment, a reference system configuration information is stored in configuration information 690 and communicated as information 691 to all evaluation units 610, 620, 630. Each variant information can contain one or more variant parameters describing the variant.

Relative algorithm and system algorithm are used similar to FIG. 10. Algorithm 612 uses relative algorithm and algorithm 613 uses system algorithm. In addition algorithm 615 uses root algorithm.

In case the root algorithm result is incompatible, this system can determine which part of the system that has correct configuration and which parts has incorrect configuration as there is master reference information 691 available from configuration information 690. That decision is made in algorithm 615 where a comparison is made with information 691 which result in information 620, indicating whether the root cause of a system compatibility/incompatibility is in evaluation unit 610 or not.

This relative algorithm result is communicated to the other evaluation units by information 618. Receiving the other evaluation units relative compatibility result is represented by information 623 and information 624. If both the relative algorithm and the system algorithm are used, then algorithm result 619 is provided as result 616.

Figure 14:
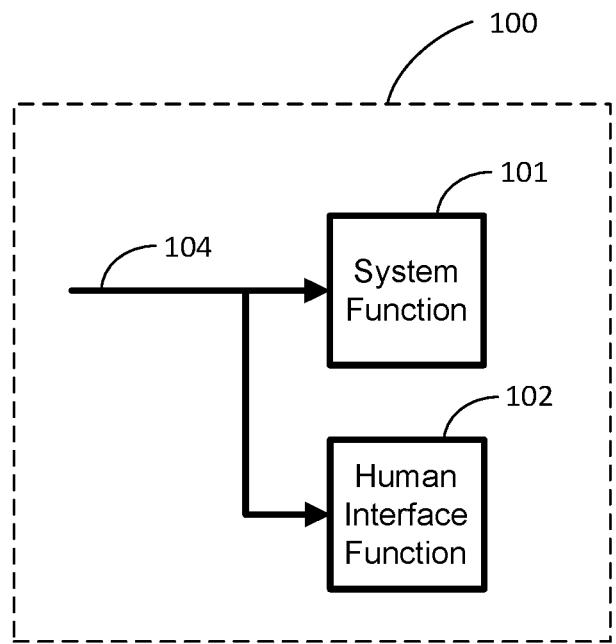
FIG. 14 is an illustration of a result of a system compatibility evaluation communicated to a system function.

In FIG. 14 it is shown the in-vehicle functions 100 that are affected by a decision information 104 in a module. Functions 100 correspond to system function 414 in FIG. 10 and system function 514 in FIG. 12. Decision information 104 corresponds to decision information 419 in FIG. 10 and decision information 519 in FIG. 12. The decision 104 is forwarded to system function 101 which is disabled when a decision 104 is received that means system is incompatible.

The decision information 104 is forwarded to human interface function 102 which can indicate to driver whether the system is compatible or not. The driver interface may be a human machine interface (HMI) e.g. a malfunction indicator lamp (MIL lamp).

Figure 15:
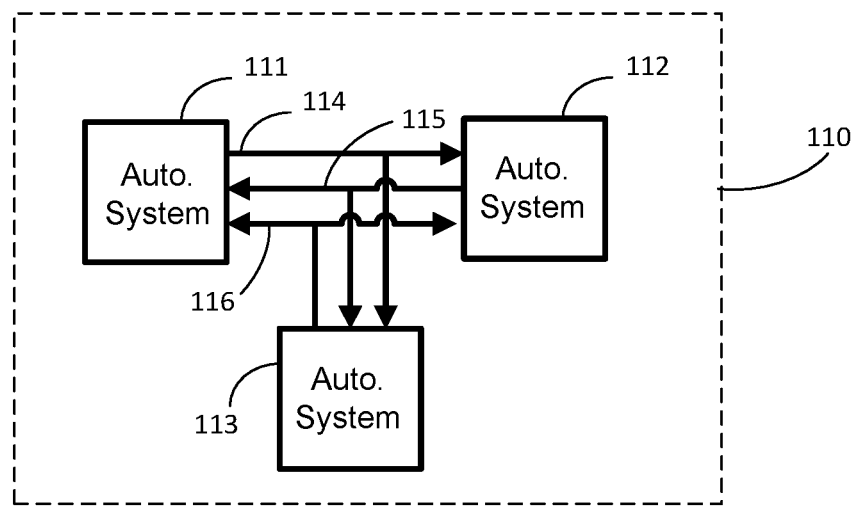
FIG. 15 is an illustration of connection of multiple systems each using a system compatibility function.

In FIG. 15 it is shown a vehicle 110 comprised of automotive systems 111, 112, 113. A system decision, compatible or incompatible as previously described, is made in each automotive system 111, 112, 113 respectively based on information 114, 115, 116. An incompatible automotive system, one of automotive systems 111, 112, 113, may affect the operation of another automotive system 111, 112, 113 which are compatible. A system that is compatible can be required to change its operation mode or disable its functions if another system is incompatible.

Figure 16:
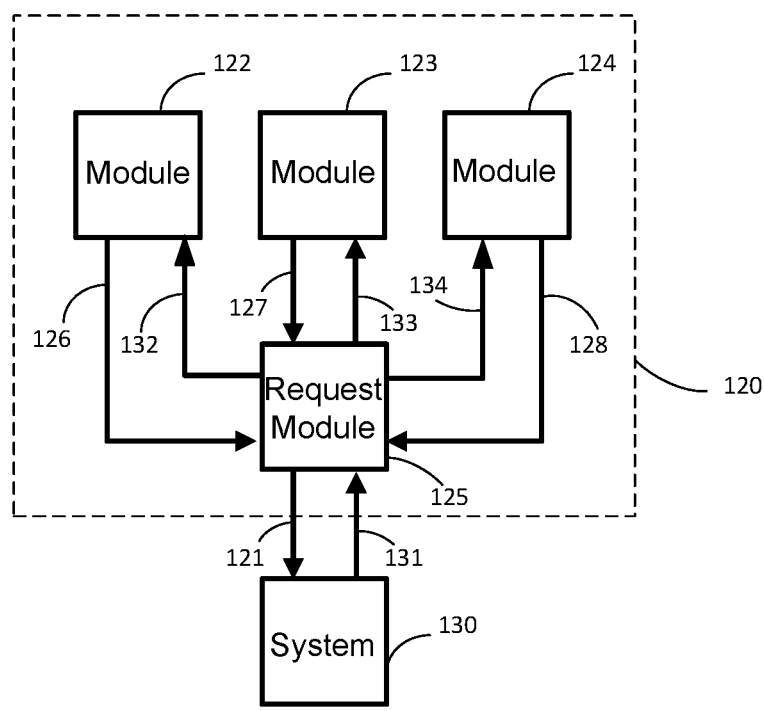
FIG. 16 is an illustration of an automotive system using system compatibility function and off board system outside the vehicle.

In FIG. 16 it is shown an automotive system 120 that is comprised of modules 122, 123, 124. System compatibility decision 126, 127, 128 from modules 122, 123, 124 is collected in module 125 which can evaluate modules 126, 127 and 128 and transmit compatibility/incompatibility information 121 to a system 130 which is not part of the automotive system 120. The system 130 can be an off-board system, e.g. an information system or a software archive accessed by a vehicle manufacturer, OEM.

If the information 121 means the system 120 is incompatible, then the system 130 can make a decision based on compatible/incompatible information 121 requesting module 125 to disable or alter function in modules 122, 123, 124 by means of information 131 and further information 132, 133, 134. The information 121 can be considered as a warning information to the off-board system.

When starting an automotive system, it can be desired to perform the compatibility evaluation soon after the start, since running an incompatible system may impose risks for permanent damage, undefined system behavior or even risk for personal injuries. Therefore, there can be a certain time interval given for performing the system compatibility evaluation.

There are at least two methods of starting the system and starting the compatibility evaluation. The first method begins with starting the system function after which the compatibility evaluation is performed and only if the result is a compatible system then the system is stopped. An advantage with this is shorter system start-up time, while a disadvantage is that an incompatible system can be started and run for some time. The second method begins with the compatibility evaluation and only if the result is a compatible system then the system function is started. An advantage with this is that an incompatible system is never started, while a disadvantage is a longer system start-up time.

Figure 17:
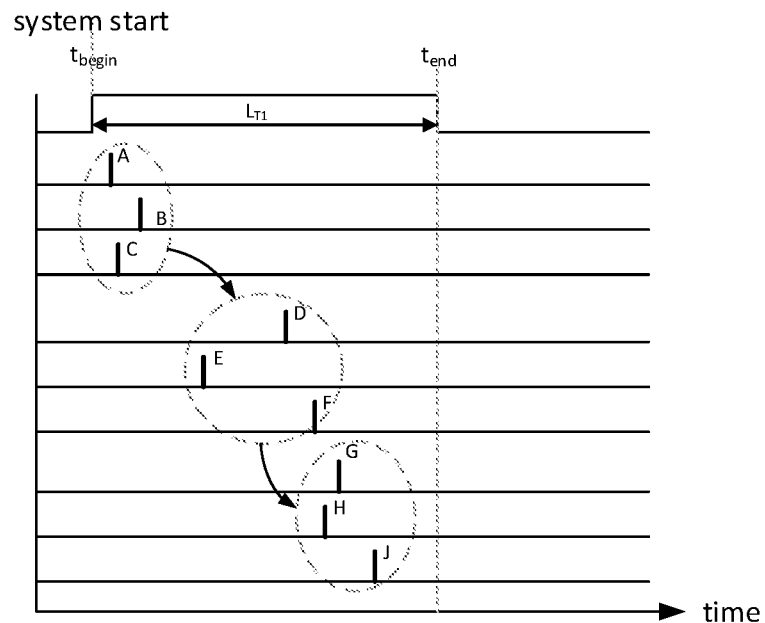
FIG. 17 is an illustration of a temporal view on compatibility function execution, with compatibility evaluation after system start.

In FIG. 17 it is shown a timing sequence for a system with three modules. The system is started at a certain time, tbegin, and a certain time, LT1, is allowed for all modules in the system to communicate their configuration information, produce local decisions, communicate local decisions and finally produce system decisions. The system starts initially without regards to whether it is compatible or incompatible, in order to improve system startup time. The time, LT1, allowed can be any duration of time.

In FIG. 17 events A, B and C represent the three modules communicating their own configuration information to each other, then some time is needed for evaluation and events D, E and F represent modules communicating their local decisions. Events G, H and J represent modules producing their system decisions.

An optional error handling can be used so that if any module do not communicate their configuration information, produce local decision, communicate local decision and produce system decision before time LT1 elapses then this is regarded as the system is incompatible. A timeout function can be used in e.g. 414 in FIG. 10.

As an alternative, the execution of the compatibility evaluation can be delayed until configuration information from all system components are available. Further, the compatibility evaluation can be made with the momentarily available configuration information, from a sub set of the system. Unavailable configuration information can be regarded as compatible, incompatible or just ignored in the evaluation until it becomes available.

Figure 18:
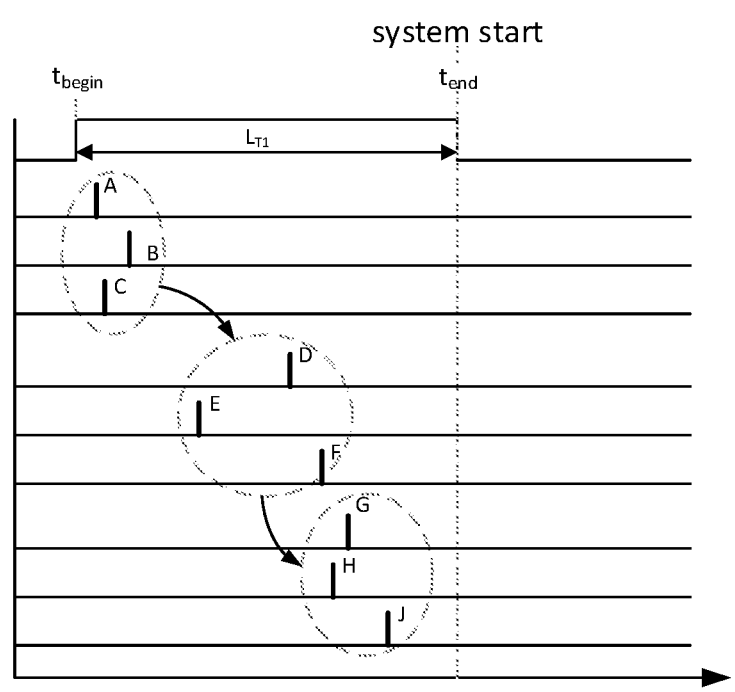
FIG. 18 is an illustration of a temporal view on compatibility function execution, with compatibility evaluation before system start.

In FIG. 18 it is shown a timing sequence for a system with three modules. The system is started in a reduced mode without customer functionality at the time tbegin. A certain time, LT1, is allowed for all modules in the system to communicate their configuration information, to evaluate the system compatibility. The system functionality related to customer functionality is delayed until a compatibility evaluation results in a compatible system, in order to e.g. ensure modularity and/or safety. LT1 in FIG. 18 is not necessarily the same time duration as LT1 in FIG. 17.

Figure 19:
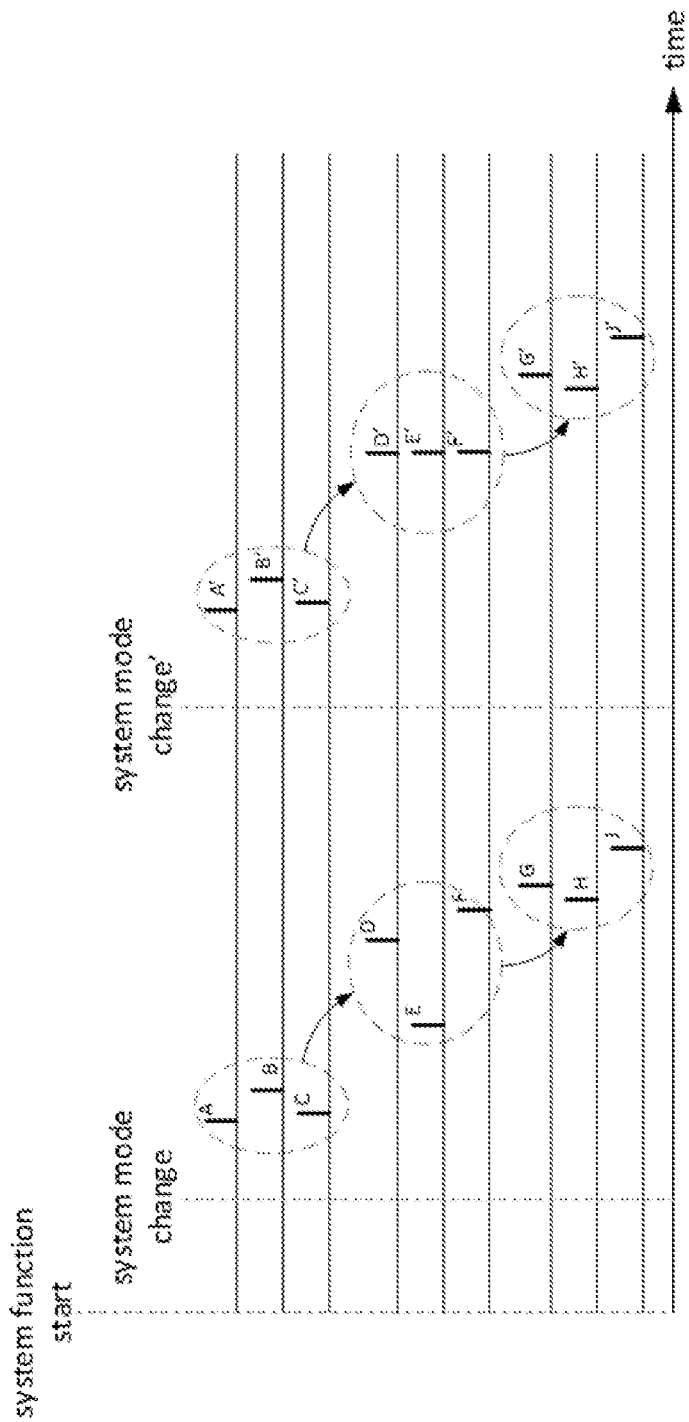
FIG. 19 is an illustration of a temporal view on compatibility function execution, with compatibility evaluation after system mode changes.

Communication between system components may be performed in an event based manner. The events being; system pre-start, system start, system mode change while running system, system shutdown. A system component that is running or change its mode can notify other system components in that system about is current configuration data, e.g. a functionality is available and of a certain configuration, or the service is no longer available. FIG. 19 shows the compatibility being evaluated after system mode changes in run-time.

At start or before start of a system component it will offer to any other system components, it's service to provide its configuration data, relative algorithm result, system algorithm result. The other system components that belong to the system will acknowledge a subscription to the service. To identify which system the configuration data belong to a system unique system identifier us used between system component, and only system components that are part of a same system will use same identifier.

When the system component gets a subscription from another system component it will send (publish) its current configuration data, relative algorithm result, system algorithm result to each subscriber.

Whenever the system component that is the publisher change its mode so that there is a change in its available system functions, becoming available, becoming unavailable, or dynamically change its configuration data it will send (publish) it's current configuration data, relative algorithm result, system algorithm result to each subscriber.

Each and all system components can subscribe and publish configuration data, relative algorithm result, system algorithm result. A subscriber can unsubscribe to configuration data, relative algorithm result, system algorithm result by sending an unsubscribe message to the publisher.

Modules local compatibility decisions and system compatibility decision can be made in different ways and connected to different system events. If the complete system is available and transmits variant information, then local compatibility decisions and system compatibility decision can be made immediately. If parts of the system are available and other parts are not available, then local compatibility decisions and system compatibility decision can be postponed until complete system is available. The availability of parts of the system can be related to system mode changes, e.g. usage modes, power modes or sleep/awake modes. The availability of parts of the system can be related to power supply, e.g. relay power.

Local compatibility decisions and system compatibility decision can be made once again after reconfiguration of the complete system or parts of the system. The system can be intentionally reconfigured with a number of different configurations in order to detect a configuration where the complete system is compatible. This can be intended as a system mitigation in order to try to achieve a system configuration that is compatible, in case it was originally configured so that the system was not compatible.

Figure 20:
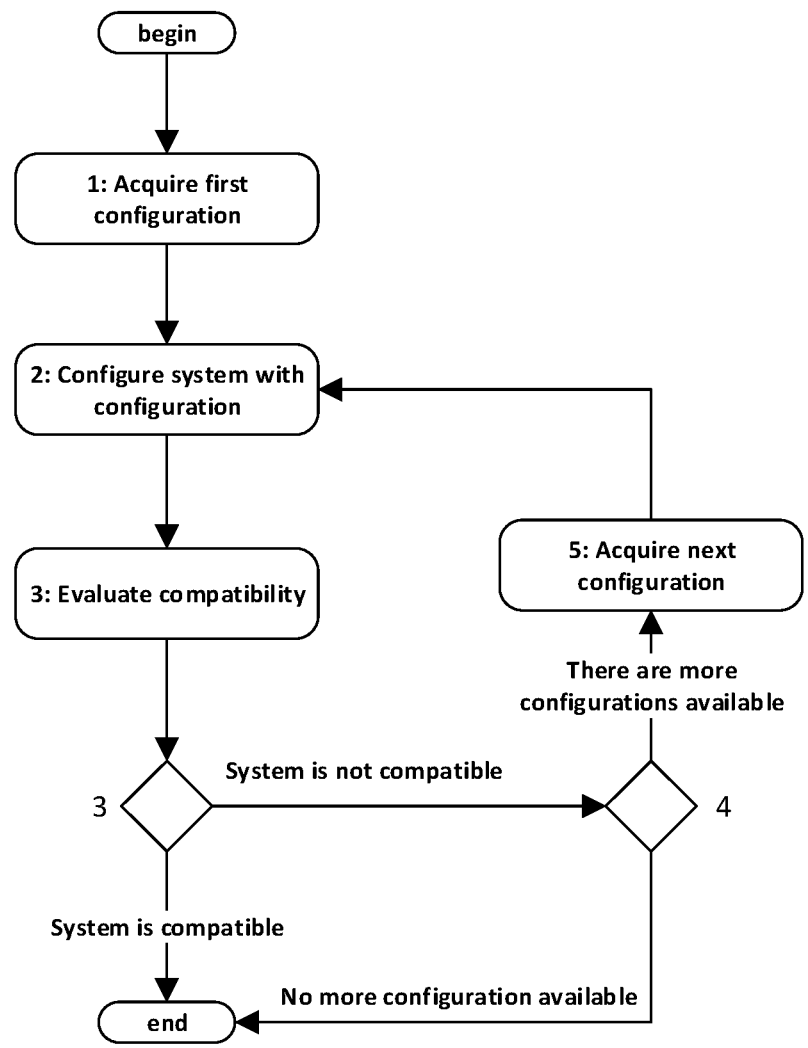
FIG. 20 is an illustration of a search algorithm for finding compatible or incompatible configuration from a number of available system configurations.

A system is configured with a number of different configurations, one configuration at a time. Each configuration consists of a combination of different system components and is at least two system components and at most the sum of all different system components. For each configuration it is evaluated if the system is compatible, based on local compatibility decisions and system compatibility decisions. The configuration of the system is performed by e.g. variant configuration master 590 in FIG. 12. In FIG. 20 it is shown an algorithm for testing a number of configurations. The purpose may be that an initial configuration was evaluated as incompatible, and it is desired to try to find another system configuration which is compatible. The step "configure system with configuration" may involve downloading software to modules.

Figure 21:
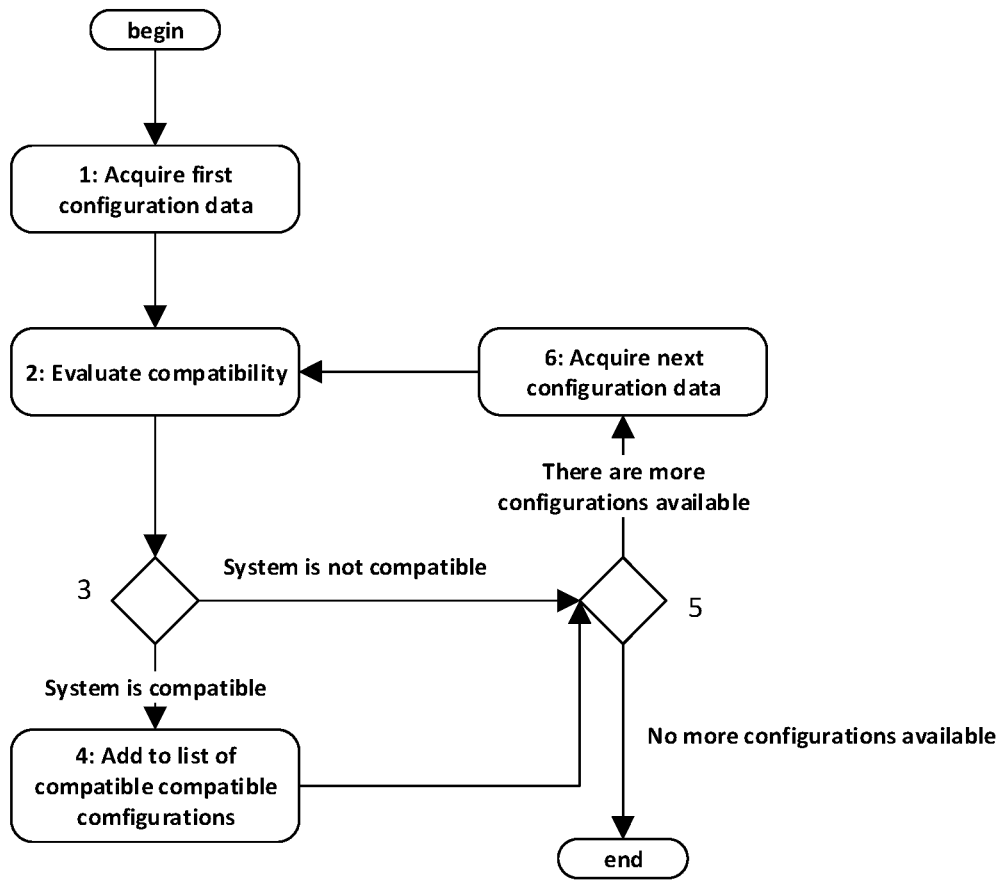
FIG. 21 is an illustration of a search algorithm for finding all compatible configurations from a number of available system configurations.

The search algorithm in FIG. 21 may be used to search among a plurality of configuration information, associated with system components belonging to a plurality of variants of a system. The search may be with the intention of finding all compatible system components of one determined system variant. In the each relative algorithm in 610, 630, 650, an acceptance configuration is used in which all of parameter values 9a, 9b, 9c, or a part of parameter values 9a, 9b, 9c, are taken from the configuration information 8a, 8b, 8c. For the parameter values in 9a, 9b, 9c which are not taken from 8a, 8b, 8c, the acceptance configuration is set to 'N/A'. Assume all variants for a safety system are the compatible variants shown in FIG. 23, FIG. 24, FIG. 28, three variants. In this example only the compatible system components for variant Higher Performance GEN1 is to be searched for in a group of all system components for all three variants. In the acceptance configuration of the relative algorithm parameter values for Safety System Generation is set to GEN1, and Safety System SubVariant is set to HighPerf. Other parameter values in acceptance configuration, Mechatronics Variant, Partial Network Variant, Com SW Variant are set to 'N/A'. The search algorithm in FIG. 21 will evaluate all system components for all the available variants of the system and find the configuration information related to system components or system functions for only Higher Performance GEN1. Only the system components for which the relative algorithm in 610, 630, 650 result is compatible and thus system algorithm 613 result is compatible and hence being according to Higher Performance GEN1, are put in a list in step 4 in FIG. 21. That list created in FIG. 21 is the result of the search for system components of Higher Performance GEN1.

Figure 22:
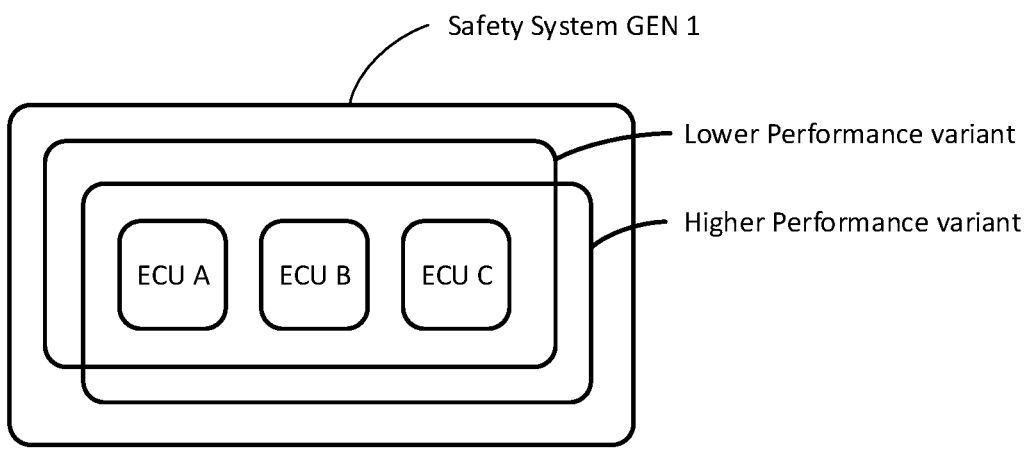
FIG. 22 is an illustration of safety system versions of GEN1; higher performance and lower performance and associated modules.

According to an embodiment of the invention, two versions of a safety system of a first system generation GEN1 is constructed, a higher performance system and a lower performance system as shown in FIG. 22. The higher performance and lower performance relate to the customer feature and attribute point of view. This could perhaps be "safety system with collision mitigation" and "safety system with collision mitigation and full auto braking and large animal detection".

The systems are comprised from same number of electronic control units (modules), but they are not identical, there are incompatible differences that the invention can detect if modules are mixed between system versions, i.e. if incompatible systems are put together.

All modules transmit variant information (being publishers) to other modules (being subscribers). All modules make their own local compatibility decision by means of relative algorithm based on local and variant information received from the other modules. Not receiving expected variant information from another module is regarded as variant information being incompatible. All modules transmit the result of their own relative algorithm result (being publishers). On system level, in the complete Higher Performance system and the complete Lower Performance system level, a system algorithm determines whether the complete system is compatible or incompatible. Those system algorithms results are made in each module.

FIG. 23 and FIG. 24 shows two versions of the system, in which the configuration of each system is compatible. It is shown transmitted variant information from each module (left side of each figure) and variant information from the other modules that is included in each modules relative algorithm and considered being compatible (right side of figure).

The higher performance system is shown in FIG. 23, and comprised of module A, B and C. There are some differences between modules regarding what type of variant information are used in each modules relative algorithm. When the system is configured according to this, then each module will make local decision meaning it is compatible with the other modules.

The lower performance system is shown in FIG. 24, and comprised of module A, B and C. There are some differences between modules regarding what type of variant information are used in each modules relative algorithm. When the system is configured according to this, then each module will make local decision meaning it is compatible with the other modules. For module A and B, it is also expected that there is no reception of variant information from any module other than module A, B and C. This is shown as no reception for an imaginary module X. Module C ignore any variant information received from an module other than module A and B.

FIG. 25 shows the condition for the system algorithm decision for module A, B and C. In each module A, B and C it is required to relative algorithm results meaning compatible in order for each module to consider the complete system to be compatible. This means the configuration in FIG. 23 and FIG. 24 together with the conditions in FIG. 25 will result in that the complete system is compatible.

FIG. 23 and FIG. 24 shows an example of a module C that is compatible with two variants of a system, the higher performance system and the lower performance system. In addition, module C is compatible with two generations of the system; GEN1 and GEN2, an example of reuse.

An example of detection of incompatible system configuration is shown in FIG. 26. Module A from the higher performance system is put in lower performance system. Module A transmits variant information "GEN1, HighPerf, A and X" to module B and module C. According to FIG. 24, module B will expect LowPerf from module A but receive HighPerf so module A and module B are incompatible, the relative algorithm result in module B will be incompatible which is communicated from module B to module A and module C. The relative result incompatible from module B will be available for all modules A, B and C for their respective system algorithms, which then becomes incompatible on system level. Result is that all modules in the complete system is aware that there is an incompatibility somewhere in the system.

Module C does not include the variant information HighPerf/LowPerf from module A in its local decision, since it is designed to ignore that. Module C considers variant information GEN1 and GEN2 from module A to be compatible so it is prepared for a GEN2 variant, although module A is GEN1 here. If module C is put in another generation of the system, e.g. GEN3, it will not be compatible with this.

A condition is determined that only a subset of available configuration information is required, e.g. Referring to FIG. 23, FIG. 24, FIG. 26 the subset can be to only consider the parameter identifiers for System Safety Generation and System Safety SubVariant, and not including Mechatronics Variant, Com SW Variant and Partial Network Variant in algorithm for determining compatible or incompatible system. The algorithm in FIG. 20 and the algorithm in FIG. 13 can be used to extract a group of compatible system components from all available system components, which fulfil the criteria for a subset of parameter identifiers.

In FIG. 13, the softwares 670 are several instances, and their configuration information 680 is associated with the softwares 670 and are run in algorithms 610, 630, 650. The softwares 670 are not executed. In FIG. 20, the steps 2, 3, 6 are made for all permutations of configuration information 680, and only the permutations that are determined compatible by the relative and system algorithm in FIG. 20 step 3 are added to a list in step 4.

Referring to FIG. 4 and FIG. 13, the relative algorithm 612 in system component 610 is run on a subset of the received configuration information 11 and the acceptance configuration information 12, e.g. only information set 13a and information set 14a, instead of all information sets 13a+14a, 13b+14b, 13c+14c, 13d+14d. The system algorithm 613 is run in the system component 610, and similar relative algorithm and system algorithms in the system components 630, 650.

When all available permutations of have been evaluated in FIG. 20 then the list created in step 4, contain the configuration information 680, which fulfill the criteria for a subset of all defined domains. The list will have associations 671, 672, 673 to the runnable softwares 614, 634, 654.

Figure 27:
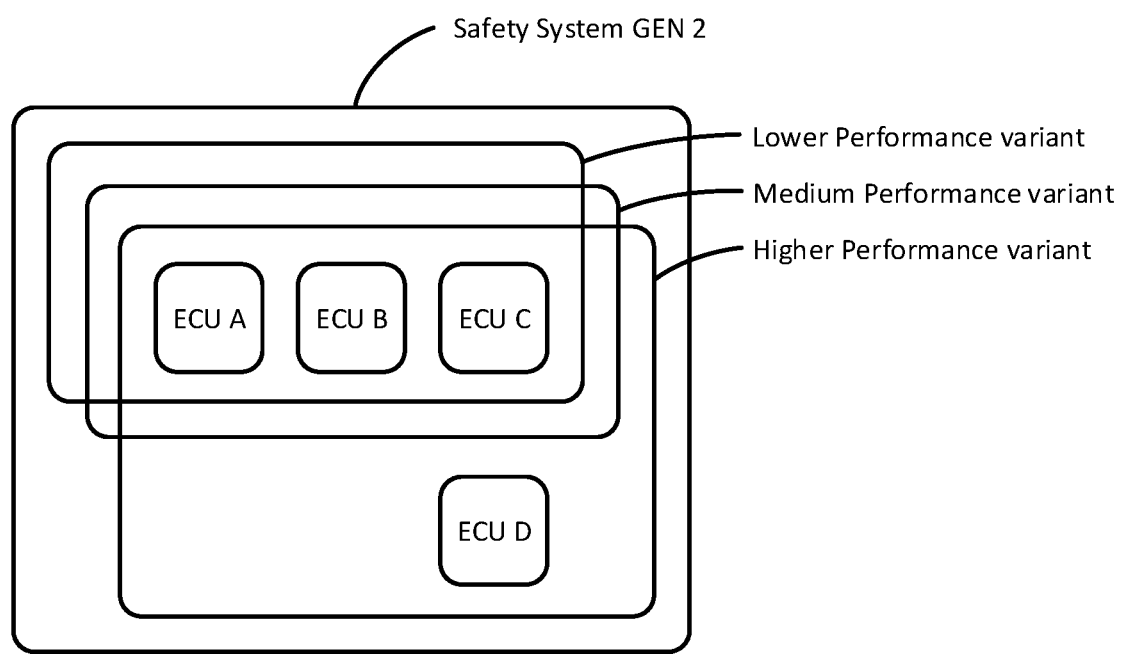
FIG. 27 is an illustration of safety system versions of GEN2; higher performance, medium performance and lower performance and associated modules.

In FIG. 27 a GEN2 version of the safety system is shown, e.g. an evolution from the previous GEN1. Module A, B and D are different from GEN1, and module C is same as in GEN1. Module C has same conditions for module A and B and ignores module D and any additional variant information. Therefore, module C can be reused in GEN 2 without changes in module C.

The higher performance system is shown in FIG. 28, and comprised of four modules; module A, B, C and D. There are some differences between modules regarding what type of variant information is used in each modules validation. For module A, B and D it is also expected that there is no reception of variant information from any module other than module A, B and C. This is shown as No Reception for an imaginary module X. Module C ignores any variant information received from modules other than module A and B.

The person skilled in the art realizes that the present invention by no means is limited to the embodiments described above. On the contrary, many modifications and variations are possible within the scope of the appended claims. For example, the compatibility verification can be used in many other applications, software as well as hardware.

Additionally, variations to the disclosed embodiments can be understood and affected by the skilled person in practicing the claimed invention, from a study of the drawings, the disclosure and the appended claims. In the claims, the word "comprising" does not exclude other elements or steps, and the indefinite article "a" or "an" does not exclude a plurality.

The invention claimed is:

1. A method of evaluating compatibility of a first system component of a vehicle, the method comprising the steps of:
providing a database comprising:
vehicle platform configuration information comprising configuration information about two or more vehicle models, wherein each vehicle model comprises one or more aspect domains, wherein each aspect domain comprises one or more system components, wherein each system component comprises configuration information, wherein each configuration information comprises a set of one or more parameter values;
wherein at least two system components of two different vehicle models belong to the same aspect domain;
wherein at least one of the number of aspect domains of each vehicle model and the number of system components of each aspect domain of said vehicle model is twenty or more;
determining a compatibility result between said first system component and at least one other system component in said vehicle platform by comparing the configuration information of said first system component to the configuration information of said at least one other system component, wherein the set of one or more parameter values in the configuration information of said first system component is compared to the set of one or more parameter values in the configuration information of said at least one other system component to determine when said sets of parameter values have at least a compatible parameter value;
wherein a positive compatibility result is only determined for those of said at least one other system component that is not the same as said first system component;
returning a compatibility result based on when said first system component is determined to be compatible with said at least one other system component and providing said vehicle with said first system component.

2. A method according to claim 1, wherein said configuration information of said system component comprises context specific vehicle configuration information and/or wherein said configuration information comprises content configuration information.

3. A method according to claim 1, wherein the step of determining a compatibility result between said first system component and at least one other system component in said vehicle platform comprises using identifiers, to which each set of parameter values is related, to determine which set of parameter values in the configuration information of said first system component to compare to which set of parameter values in the configuration information of said at least one other system component.

4. A method according to claim 1, wherein the step of determining a compatibility result between said first system component and at least one other system component in said vehicle platform comprises comparing a plurality of sets of parameter values in the configuration information of said first system component to a plurality of sets of parameter values in the configuration information of said at least one other system component to determine when each compared pair of sets of parameter values have at least a compatible parameter value between them.

5. A method according to claim 1, further comprising a step of determining a compatibility result between the first system component and a system master by comparing a configuration information of said first system component to a configuration information of said system master, wherein a set of parameter values in the configuration information of said first system component is compared to a set of parameter values in the configuration information of said system master to determine when said sets of parameter values have at least a compatible parameter value, and wherein the step of returning a compatibility result is based on when said first system component is determined to be compatible with said at least one other system component and with the system master.

6. A method according to claim 1, wherein the method is executed locally in the first system component.

7. A method according to claim 1, wherein the first system component is disabled when the result incompatible is returned.

8. A method according to claim 1, wherein the compatibility result is stored locally in the first system component until a new compatibility result is acquired.

9. A method according to claim 1, wherein the method is performed for all system components in a vehicle model and further comprises a step of determining that said vehicle model is compatible when all system components return the result compatible, otherwise determining that said vehicle model is incompatible.

10. A method according to claim 9, wherein the method is performed prior to a start-up of a vehicle system and incompatibility prevents the start-up of the vehicle system; or wherein the method is performed within a predetermined time interval after a start-up of a vehicle system and incompatibility forces a shut-down of the vehicle system and/or after a start-up of a vehicle system said vehicle system runs with reduced functionality until the method has returned the result compatible.

11. A method according to claim 9, wherein when any system component does not communicate within a predetermined time interval after being ordered to execute the method, incompatibility of the system component is determined.

12. A method according to claim 9, further comprising a step of, when the vehicle model is determined to be incompatible, evaluating when there are alternative configurations available in the vehicle model and when so, acquire a next configuration for the vehicle model and repeating the method until compatibility is achieved or until the method has been completed for all configurations of the vehicle model.

13. A method according to claim 1, wherein said first system component is an electronic control unit.

14. A system for evaluating compatibility of a first system component of one of a vehicle and a vehicle model, the system comprising:
- a database comprising: vehicle platform configuration information comprising configuration information about two or more vehicle models, wherein each vehicle model comprises one or more aspect domains, wherein each aspect domain comprises one or more system components, wherein each system component comprises configuration information, wherein each configuration information comprises a set of one or more parameter values;
- wherein at least two system components of two different vehicle models belong to the same aspect domain;
- wherein at least one of the number of aspect domains of each vehicle model and the number of system components of each aspect domain of said vehicle model is twenty or more;
- a processor configured to receive: configuration information of a first system component and configuration information of at least one other system component, and configured to based on said received information determining a compatibility result between said first system component and at least one other system component in said vehicle platform by comparing the configuration information of said first system component to the configuration information of said at least one other system component, wherein the set of one or more parameter values in the configuration information of said first system component is compared to the set of one or more parameter values in the configuration information of said at least one other system component to determine when said sets of parameter values have at least a compatible parameter value; and configured to:
- return a compatibility result based on when said first system component is determined to be compatible with said at least one other system component and direct providing one of said vehicle and said vehicle model with said first system component.

15. A system according to claim 14, wherein said database is partly or fully distributed in a plurality of vehicles.

16. A method of evaluating compatibility of a first system component of a vehicle model, the method comprising the steps of:
- providing a database comprising:
- vehicle platform configuration information comprising configuration information about two or more vehicle models, wherein each vehicle model comprises one or more aspect domains, wherein each aspect domain comprises one or more system components, wherein each system component comprises configuration information, wherein each configuration information comprises a set of one or more parameter values;
- wherein at least two system components of two different vehicle models belong to the same aspect domain;
- wherein at least one of the number of aspect domains of each vehicle model and the number of system components of each aspect domain of said vehicle model is twenty or more;
- determining a compatibility result between said first system component and at least one other system component in said vehicle platform by comparing the configuration information of said first system component to the configuration information of said at least one other system component, wherein the set of one or more parameter values in the configuration information of said first system component is compared to the set of one or more parameter values in the configuration information of said at least one other system component to determine when said sets of parameter values have at least a compatible parameter value;
- wherein a positive compatibility result is only determined for those of said at least one other system component that is not the same as said first system component;
- returning a compatibility result based on when said first system component is determined to be compatible with said at least one other system component, and providing said vehicle model with said first system component.

* * * * *